United States Patent
Chen et al.

(10) Patent No.: US 11,361,444 B2
(45) Date of Patent: Jun. 14, 2022

(54) INFORMATION PROCESSING DEVICE, AERIAL PHOTOGRAPHY PATH GENERATING METHOD, AERIAL PHOTOGRAPHY PATH GENERATING SYSTEM, PROGRAM, AND RECORDING MEDIUM

(71) Applicant: SZ DJI TECHNOLOGY CO., LTD., Shenzhen (CN)

(72) Inventors: Bin Chen, Shenzhen (CN); Xiangwei Wang, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 180 days.

(21) Appl. No.: 16/678,128

(22) Filed: Nov. 8, 2019

(65) Prior Publication Data
US 2020/0074656 A1   Mar. 5, 2020

Related U.S. Application Data

(63) Continuation of application No. PCT/CN2017/108414, filed on Oct. 30, 2017.

(30) Foreign Application Priority Data

May 19, 2017   (JP) .............................. JP2017-100357

(51) Int. Cl.
*G06T 7/11*   (2017.01)
*G06T 7/55*   (2017.01)
(Continued)

(52) U.S. Cl.
CPC .............. *G06T 7/11* (2017.01); *B64C 39/024* (2013.01); *G06T 7/0002* (2013.01); *G06T 7/10* (2017.01);
(Continued)

(58) Field of Classification Search
CPC ..... G06T 7/11; G06T 7/55; G06T 7/10; G06T 7/0002; G06T 2207/10032;
(Continued)

(56) References Cited

U.S. PATENT DOCUMENTS 9,823,658 B1 *  11/2017  Loveland ............... G01C 11/02
2010/0017114 A1  1/2010  Tehan et al.
(Continued)

FOREIGN PATENT DOCUMENTS

CA         2920388     *  5/2015   ............. G01C 21/20
CN     105843253 A        8/2016
(Continued)

OTHER PUBLICATIONS

The World Intellectual Property Organization (WIPO) International Search Report for PCT/CN2017/108414 dated Feb. 23, 2018 5 pages.

*Primary Examiner* — Jerome Grant, II
(74) *Attorney, Agent, or Firm* — Anova Law Group, PLLC

(57) ABSTRACT

An information processing device includes a first acquisition member configured to obtain information relating to an aerial photography range for aerial photographing a first aerial photography image, a segmenting member configured to segment the aerial photography range into multiple areas based on a feature of each imaged object existing in the aerial photography range, and a determination member to determine a first imaging mode for aerial photographing the first aerial photography image based on the segmented areas. The information processing device also includes a second acquisition member configured to obtain information of more than one path shape based on information of more than one imaging mode, and information of path shapes representing shapes of more than one aerial photography path, and the first imaging mode. The information processing (Continued)

device further includes a generating member configured to generate the first aerial photography path based on the at least one path shape.

18 Claims, 26 Drawing Sheets

(51) Int. Cl.
*G06T 7/10* (2017.01)
*B64C 39/02* (2006.01)
*G06T 7/00* (2017.01)

(52) U.S. Cl.
CPC .......... *G06T 7/55* (2017.01); *B64C 2201/123* (2013.01); *B64C 2201/127* (2013.01); *G06T 2207/10032* (2013.01)

(58) Field of Classification Search
CPC ........ G06T 2207/10028; B64C 39/024; B64C 2201/123; B64C 2201/127; G05D 1/0094; H04N 5/222; H04N 5/232; G01C 21/20
USPC ....................................................... 382/100
See application file for complete search history.

(56) References Cited

U.S. PATENT DOCUMENTS

| | | |
|---|---|---|
| 2010/0286859 A1 | 11/2010 | Feigh et al. |
| 2014/0316616 A1* | 10/2014 | Kugelmass ........... G06T 11/206 701/8 |
| 2016/0091898 A1* | 3/2016 | Booher ................ G05D 1/0274 701/26 |
| 2016/0253808 A1* | 9/2016 | Metzler .................. G01C 15/00 382/103 |
| 2016/0306356 A1* | 10/2016 | Tebay ................... B64C 39/024 |
| 2016/0353049 A1* | 12/2016 | Maley ..................... G06T 11/20 |
| 2017/0193553 A1* | 7/2017 | Busch .................. G06Q 20/322 |
| 2017/0221241 A1* | 8/2017 | Hannah ................ B64C 39/024 |
| 2018/0232871 A1* | 8/2018 | Terry .................... H04W 24/10 |
| 2020/0218289 A1* | 7/2020 | Gu ......................... B64D 47/08 |

FOREIGN PATENT DOCUMENTS

| | | |
|---|---|---|
| CN | 105912288 A | 8/2016 |
| CN | 106197426 A | 12/2016 |
| CN | 106444841 A | 2/2017 |
| JP | 2010061216 A | 3/2010 |
| JP | 2016538651 A | 12/2016 |
| WO | 2015163012 A1 | 10/2015 |

* cited by examiner

FIG. 22A

| database imaging mode | path shape | user review | selectivity | aerial photography image | imaged object shape | aerial photography path | aerial photography time | aerial photography season | aerial photography weather |
|---|---|---|---|---|---|---|---|---|---|
| mountain | M1 | 4.5 | 100 | image A | imaged object shape A1 | path A | 7:00 | spring | sunny |
| | M2 | 4.0 | 90 | image B | imaged object shape B1 | path B | 12:00 | summer | cloudy |
| | M3 | 3.2 | 80 | image C | imaged object shape C1 | path C | 15:00 | fall | rain |
| | M4 | 3.5 | 70 | image D | imaged object shape A2 | path D | 17:00 | winter | sunny |
| | ... | | | | | | | | |

991A

| aerial phogoraphy image | aerial phogoraphy field of view | aerial phogoraphy direction | aerial phogoraphy attitude | imaging range of aerial phogoraphy | distance to imaged object |
|---|---|---|---|---|---|
| image A | 80 degrees | direction A | attitude A | imaging range A | 100m |
| image B | 90 degrees | direction B | attitude B | imaging range B | 80m |
| image C | 60 degrees | direction C | attitude C | imaging range C | 50m |
| image D | 100 degrees | direction D | attitude D | imaging range D | 30m |

INFORMATION PROCESSING DEVICE, AERIAL PHOTOGRAPHY PATH GENERATING METHOD, AERIAL PHOTOGRAPHY PATH GENERATING SYSTEM, PROGRAM, AND RECORDING MEDIUM

CROSS-REFERENCE TO RELATED APPLICATIONS

This application is a continuation application of International Application No. PCT/CN2017/108414, filed on Oct. 30, 2017, which claims priority to Japanese Patent Application No. JP2017-100357, filed on May 19, 2017, the entire contents of which are incorporated herein by reference.

TECHNICAL FIELD

The present disclosure relates to an information processing device for generating an aerial photography path for aerial photography through a flying object, an aerial photography path generating method, an aerial photography generating system, a program, and a recording medium.

BACKGROUND

A platform (e.g., unmanned aerial vehicle) has been well known that can travel along a predetermined, fixed path while capturing images. The platform receives an imaging instruction from a ground base, and captures images of an imaged object. When the platform captures images of the imaged object, the platform flies along a fixed path while tilting an imaging device of the platform to capture the images based on a position relationship between the platform and the imaged object.

PRIOR ART DOCUMENTS

Patent Document

Patent Document 1: Japanese Patent Publication No. 2010-61216.

SUMMARY

Technical Issues Addressed by the Present Disclosure

Although Patent Document 1 discloses an unmanned aerial vehicle ("UAV") that can perform imaging along a fixed path, the fixed path is a universal aerial photography path, which may not be an aerial photography path that fits a user's preference. In other words, the aerial photography path used for capturing images in the aerial photography may not be an aerial photography path that can enable the capture of attractive aerial photography images that are recognized from a subject or an objective perspective.

On the other hand, in order to obtain attractive aerial photography images, a user need to manually perform test imaging to find a desired aerial photography path. Specifically, the user can operate a remote controller ("PROPO"). The remote controller can control the UAV to fly toward a desired direction, and can transmit an imaging instruction to the UAV such that the UAV can perform image capturing. The user may confirm the images captured by the UAV. In order to confirm the aerial photography height, the aerial photography path, the setting of the camera for aerial photography, and other factors, the user need to repeatedly perform the test imaging for multiple times. Through the operations of the user, the remote controller can select a desired aerial photography path from multiple aerial photography paths that the UAV has travelled through in test imaging, and record the selected path as the aerial photography path for future aerial photography.

In addition, the technical solution disclosed in Patent Document 1 is difficult to realize the determination of imaged object that is a key imaging target, and to perform the aerial photography consistent with characteristics of the determined imaged object (e.g., the shape of the imaged object). For example, when imaging has not been performed in the past for a range where the imaged object, which is the imaging target, is located, aerial photography may not be performed along an aerial photography path that fits the shape of the imaged object. Attractive imaging may be difficult to perform for the imaged object.

Technical Solutions for Addressing the Technical Issues

In accordance with an aspect of the present disclosure, there is provided an information processing device. The information processing device includes a first acquisition member configured to obtain information relating to an aerial photography range for aerial photographing a first aerial photography image. The information processing device also includes a segmenting member configured to segment the aerial photography range into multiple areas based on a feature of each imaged object existing in the aerial photography range. The information processing device also includes a determination member configured to determine a first imaging mode for aerial photographing the first aerial photography image based on the segmented areas. The information processing device also includes a second acquisition member configured to obtain information of more than one path shape based on information of more than one imaging mode, and information of path shapes representing shapes of more than one aerial photography path, and the first imaging mode. The information processing device further includes a generating member configured to generate the first aerial photography path based on the at least one path shape.

In accordance with another aspect of the present disclosure, there is provided an aerial photography path generating method. The aerial photography path generating method includes obtaining information relating to an aerial photography range for aerial photographing the first aerial photography image. The aerial photography path generating method also includes segmenting the aerial photography range into multiple areas based on a feature of each imaged object existing in the aerial photography range. The aerial photography path generating method also includes determining a first imaging mode for aerial photographing the first aerial photography image based on the segmented areas. The aerial photography path generating method also includes obtaining information of more than one path shape based on information of more than one imaging mode, and information of path shapes representing shapes of more than one aerial photography path, and the first imaging mode. The aerial photography path generating method further includes generating the first aerial photography path based on the at least one path shape.

In accordance with another aspect of the present disclosure, there is provided a non-transitory computer-readable storage medium encoded with computer-readable instructions, which when executed by a processor, cause the processor to perform a method. The method includes obtaining information relating to an aerial photography range for aerial photographing the first aerial photography image. The method also includes segmenting the aerial photography range into multiple areas based on a feature of each imaged object existing in the aerial photography range. The method also includes determining a first imaging mode for aerial photographing the first aerial photography image based on the segmented areas. The method also includes obtaining information of more than one path shape based on information of more than one imaging mode, and information of path shapes representing shapes of more than one aerial photography path, and the first imaging mode. The method further includes generating the first aerial photography path based on the at least one path shape.

In addition, the above summary does not list all of the features of the present disclosure. Further, sub-combination of these feature groups may form a part of the present disclosure.

BRIEF DESCRIPTION OF THE DRAWINGS

To better describe the technical solutions of the various embodiments of the present disclosure, the accompanying drawings showing the various embodiments will be briefly described. As a person of ordinary skill in the art would appreciate, the drawings show only some embodiments of the present disclosure. Without departing from the scope of the present disclosure, those having ordinary skills in the art could derive other embodiments and drawings based on the disclosed drawings without inventive efforts.

FIG. 22A is a schematic illustration of information stored in a path shape DB, according to an example embodiment.

FIG. 22B is a schematic illustration of information stored in the path shape DB (connecting with FIG. 22A), according to an example embodiment.

DETAILED DESCRIPTION OF THE EMBODIMENTS

Figure 1:
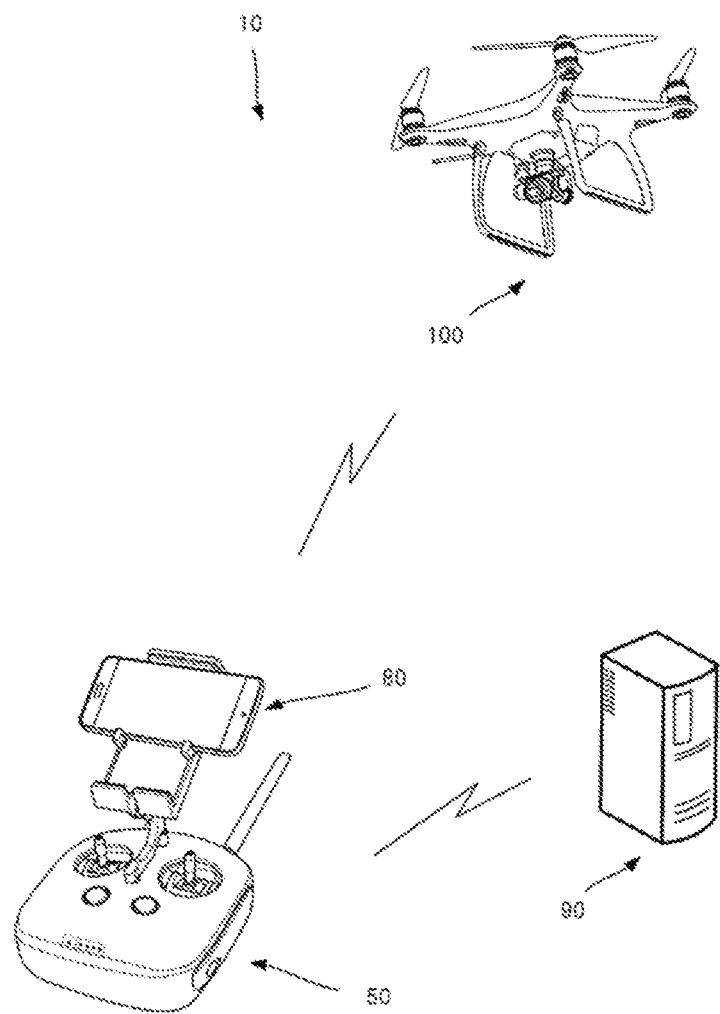
FIG. 1 is a schematic illustration of a configuration of a system for generating an aerial photography path, according to an example embodiment.

Next, the technical solutions of the present disclosure will be described in detail with reference to the accompanying drawings. The described embodiments are only some, but not all of the embodiments of the present disclosure, and do not limit the scope of the claims. Not all of the combinations of the features described below may be necessary for the technical solutions of the present disclosure.

The claims, specification, drawings, and abstract include items subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

In the embodiments described below, an unmanned aerial vehicle is used as an example of the flying object. The flying object includes any aircraft movable in the sky. In the drawings of the present disclosure, the unmanned aerial vehicle is marked as "UAV." In addition, a portable terminal is used as an example of the information processing device. Besides the portable terminal, the information processing device may also be a UAV, a transmitter, a personal computer, or other information processing devices. The aerial photography path generating method defines the actions performed by the information processing device. The recording medium may store a program (e.g., a program that causes the information processing device to execute various processes).

The terms "comprise," "comprising," "include," and the like specify the presence of stated features, steps, operations, elements, and/or components but do not preclude the presence or addition of one or more other features, steps, operations, elements, components, and/or groups. The term "communicatively couple(d)" or "communicatively connect (ed)" indicates that related items are coupled or connected through a communication channel, such as a wired or wireless communication channel. The term "unit," "sub-unit," or "module" may encompass a hardware component, a software component, or a combination thereof. For example, a "unit," "sub-unit," or "module" may include a housing, a device, a sensor, a processor, an algorithm, a circuit, an electrical or mechanical connector, etc. The term "processor" may include any suitable processor, which may include hardware, software, or a combination thereof. The processor may be a generic processor or a dedicated processor, which may be specially programmed to perform certain functions.

The symbol "/" means "or" between the related items separated by the symbol. The phrase "at least one of" A, B, or C encompasses all combinations of A, B, and C, such as A only, B only, C only, A and B, B and C, A and C, and A, B, and C. The term "and/or" may be interpreted as "at least one of."

FIG. 1 is a schematic illustration of a configuration of an aerial photography path generating system 10. The aerial photography path generating system 10 may include one or more than one UAV 100, a transmitter 50, a portable terminal 80, and a server device 90. The UAV 100, the transmitter 50, the portable terminal 80, and the server device 90 may communicate with one another through a wired or wireless communication (e.g., wireless local area network ("LAN")). The portable terminal 80 may be an example of an information processing device. The server device 90 may be an example of a recording device.

The UAV 100 may fly according to remote operations performed by the transmitter 50, or may fly according to a predetermined flight path. The transmitter 50 may control the flight of the UAV 100 through remote operations. That is, the transmitter 50 may operate as a remote controller. The portable terminal 80 and the transmitter 50 may be carried by a user who is scheduled to use the UAV 100 for aerial photography. The portable terminal 80 and the server device 90 may cooperate with one another to generate the aerial photography path of the UAV 100 and imaging information related to imaging performed by the UAV 100. The server device 90 may store a path shape indicating a shape of the aerial photography path for the aerial photography by the UAV 100. The server device 90 may provide the stored path shape sample based on a request from the portable terminal 80.

Figure 2:
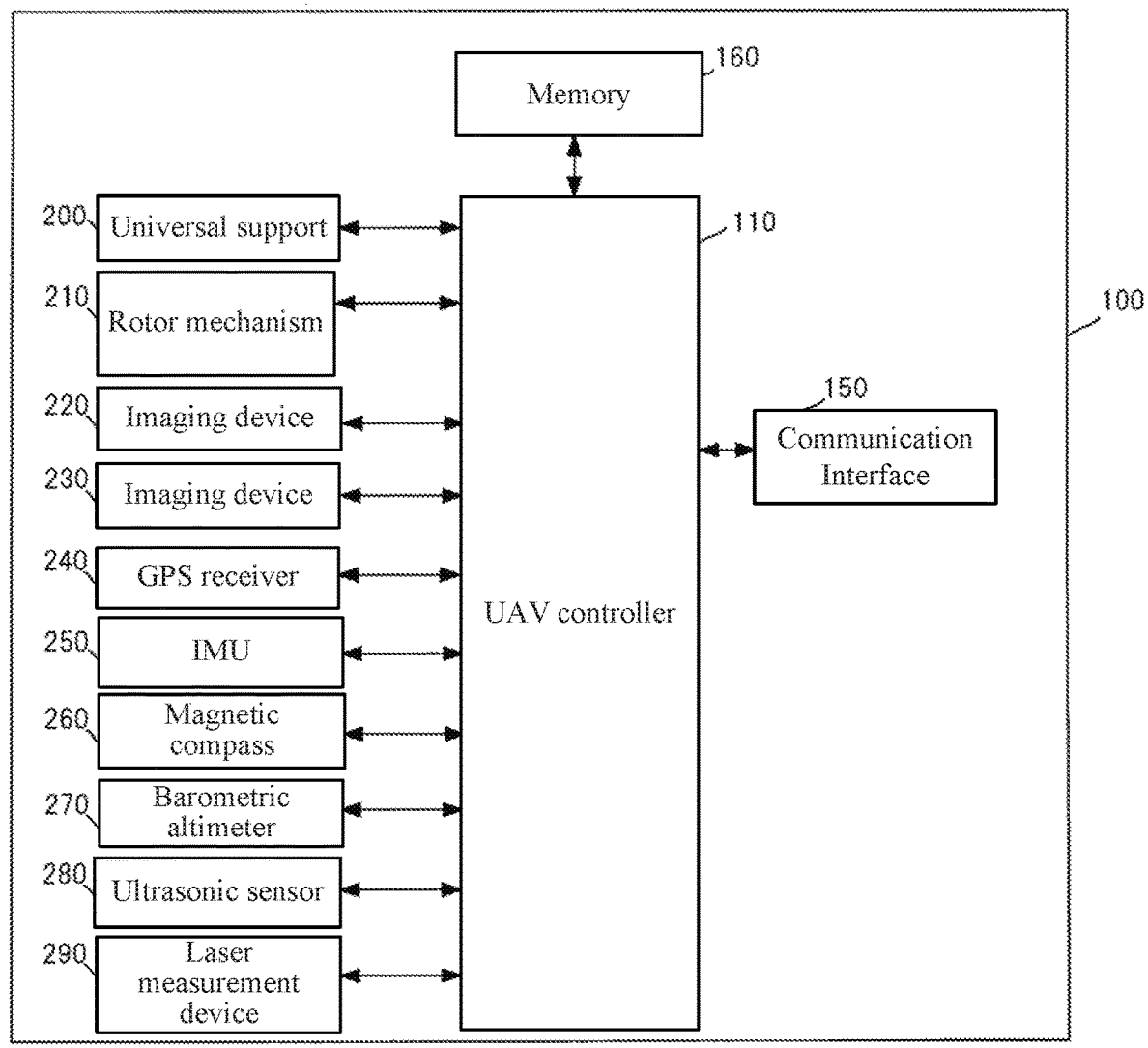
FIG. 2 is a schematic diagram of a hardware configuration of a UAV, according to an example embodiment.

FIG. 2 is a schematic diagram of a hardware configuration of the UAV 100. The configuration of the UAV 100 may include a UAV controller 110, a communication interface 150, a memory 160, a universal support 200, a rotor mechanism 210, an imaging device 220, an imaging device 230, a GPS receiver 240, an inertial measurement unit ("IMU") 250, a magnetic compass 260, a barometric altimeter 270, an ultrasound sensor 280, and a laser measurement device 290.

The UAV controller 110 may include one or more of a central processing unit ("CPU"), a micro processing unit ("MPU"), or a digital signal processor ("DSP"). The UAV controller 110 may be configured to execute signal processing for overall control of actions of various parts of the UAV 100, input and output processing of data with other various parts, and computational processing of data and storage processing of data.

The UAV controller 110 may control the flight of the UAV 100 based on a program stored in the memory 160. For example, the flight of the UAV 100 may be controlled based on the aerial photograph path obtained from the portable terminal 80. The UAV controller 110 may control the flight of the UAV 100 based on instructions received from the remote transmitter 50. The memory 160 may be detachable from the UAV 100.

The UAV controller 110 may obtain location information of a location of the UAV 100. The UAV controller 110 may obtain location information of the latitude, the longitude, and the altitude where the UAV 100 is located from the GPS receiver 240. The UAV controller 110 may receive the latitude and longitude information of the latitude and the longitude at which the UAV 100 is located from the GPS receiver 240, and may receive altitude (i.e., height) information of the height at which the UAV 100 is located from the barometric altimeter 270, and use the received information as the location information.

The UAV controller 110 may obtain facing direction information of a facing direction of the UAV 100 from the magnetic compass 260. The facing direction information may indicate an orientation corresponding to a facing direction of the head of the UAV 100.

The UAV controller 110 may obtain information relating to respective imaging range of the imaging device 220 and the imaging device 230. The UAV controller 110 may obtain field of view information relating to the field of views of the imaging device 220 and the imaging device 230 from the imaging device 220 and the imaging device 230, respectively, and use the field of view information as a parameter for determining the imaging range. The UAV controller 110 may obtain information indicating an imaging direction of the imaging device 220 and the imaging device 230, respectively, and use that as a parameter for determining the imaging range. The UAV controller 110 may obtain attitude information relating to an attitude state of the imaging device 220 from the universal support 200. The UAV controller 110 may obtain information indicating the facing direction of the UAV 100, information indicating the attitude state of the imaging device 220, and an angle rotated by the universal support 200 from a base rotation angle of a pitch axis and a yaw axis. The UAV controller 110 may obtain location information of the location of the UAV 100, and may use the location information as a parameter for determining the imaging range. The UAV controller 110 may obtain information indicating the imaging range by specifying an imaging range indicating a geographical range for imaging by the imaging device 220, and generating information indicating the imaging range, based on the respective field of view and imaging direction of the imaging device 220 and the imaging device 230, and the location of the UAV 100.

UAV controller 110 may control the universal support 200, the rotor mechanism 210, the imaging device 220, and the imaging device 230. The UAV controller 110 may control the imaging range of the imaging device 220 by changing the imaging direction or field of view of the imaging device 220. The UAV controller 110 may control the imaging range of the imaging device 220 supported by the universal support 200 by controlling a rotation mechanism of the universal support 200.

The imaging range refers to a geographical range for imaging by the imaging device 220 or the imaging device 230. The imaging range may be defined by the latitude, longitude, and altitude. The imaging range may be a range of three-dimensional space data defined by the latitude, longitude, and altitude. The imaging range may be determined based on the field of view and imaging direction of the imaging device 220 or the imaging device 230, and the location of the UAV 100. The imaging direction of the imaging device 220 and the imaging device 230 may be defined by the orientation of the front face and the pitch angle of the imaging lens provided at the imaging device 220 and the imaging device 230. The imaging direction of the imaging device 220 may be a direction determined based on the orientation of the head of the UAV 100 and the attitude state of the imaging device 220 relative to the universal support 200. The imaging direction of the imaging device 230 may be a direction determined based on the orientation of the head of the UAV 100 and the location where the imaging device 230 is provided.

For the image (i.e., aerial photography image) captured by the imaging device 220 or the imaging device 230, the UAV controller 110 may attach information related to the aerial photography image as appended information (an example of the metadata). The aerial photography image may be an aerial photography dynamic image. The appended information may include information related to the flight (i.e., flight information) of the UAV when performing the aerial photography, and information related to the imaging (i.e., imaging information) by the imaging device 220 or the imaging device 230 during aerial photography. The flight information may include at least one of aerial photography location information, aerial photography path information, aerial photography time information, aerial photography period information, and aerial photography weather information. The imaging information may include at least one of aerial photography field of view information, aerial photography direction information, aerial photography attitude information, imaging range information, and imaged object distance information.

The aerial photography path information indicates a path for aerial photographing the images (i.e., aerial photography path). The aerial photography path information may be path information when obtaining a dynamic image as an aerial photography image, and may be formed by an aerial photography location set that includes aerial photography locations consecutively arranged. The aerial photography path information may be information related to the set of locations for capturing aerial photography dynamic images. The aerial photography location may be a location obtained based on the GPS receiver 240. The aerial photography time information may indicate a time of capturing the aerial photography image (i.e., an aerial photography time). The aerial photography time information may be based on the time information of a timer referenced to by the UAV controller 110. The aerial photography period information may indicate a period when the aerial photography image is captured (e.g., a season). The aerial photography time information may be based on the date and time information of the timer that the UAV controller 110 refers to. The aerial photography weather information may indicate the weather when the aerial photography image is captured. The aerial photography weather information may be based on detection information detected by the UAV 100 through a thermometer and a hygrometer (not shown), or may be based on information related to the weather obtained from an external server through the communication interface 150.

The aerial photography field of view information may indicate the field of view information of the imaging device 220 or the imaging device 230 when the aerial photography image is captured. The aerial photography direction information may indicate the imaging direction (i.e., the aerial photography direction) of the imaging device 220 or the imaging device 230 when the aerial photography image is captured. The aerial photography attitude information may indicate the attitude information of the imaging device 20 or the imaging device 230 when the aerial photography image is captured. The aerial photography range information may indicate the imaging range of the imaging device 220 or the imaging device 230 when the aerial photography image is captured. The imaged object distance information may indicate information of the distance from the imaging device 220 or the imaging device 230 to the imaged object. The imaged object distance information may be based on detection information measured by the ultrasonic sensor 280 or the laser measurement device 290. In addition, the imaging information may also include information of the facing direction of the UAV 100 during aerial photography, and other parameters related to the imaging.

The communication interface 150 may communicate with the transmitter 50, the portable terminal 80, and the server device 90. The communication interface 150 may receive aerial photography path information and the imaging information from a device that generates the aerial photography path. The device that generates the aerial photography path may be the transmitter 50, the portable terminal 80, or other devices.

The communication device 150 may receive various instructions or information for the UAV controller 110 from the remote transmitter 50.

The memory 160 may store one or more programs for the UAV controller 110 to control the universal support 200, the rotor mechanism 210, the imaging device 220, the imaging device 230, the GPS receiver 240, the IMU 250, the magnetic compass 260, the barometric altimeter 270, the ultrasonic sensor 280, and the laser measurement device 290. The memory 160 may be a non-transitory computer-readable storage medium, which may include at least one of the following flash memories: a Static Random Access Memory ("SRAM"), a Dynamic Random Access Memory ("DRAM"), an Erasable Programmable Read Only Memory ("EPROM"), an Electrically Erasable Programmable Read-Only Memory ("EEPROM"), and a Universal Serial Bus ("USB") memory.

The memory 160 may store the information of the aerial photography path and the imaging information obtained through the communication interface 150. The information of the aerial photography path may be retrieved or read from the memory 160 during the aerial photography. The UAV 100 may fly along the aerial photography path. The imaging information may be retrieved or read from the memory 160 during the aerial photography. The imaging device 220 or the imaging device 230 may perform aerial photography based on the imaging information.

The universal support 200 may support the imaging device 220 while rotatable around the yaw axis, the pitch axis, and the roll axis. The universal support 200 may change the imaging direction of the imaging device 220 by causing the imaging device 220 to rotate around at least one of the yaw axis, the pitch axis, and the roll axis.

The yaw axis, the pitch axis, and the roll axis may be determined as follows. For example, the roll axis may be defined as a horizontal direction (the direction parallel with the ground). At this moment, the pitch axis may be determined as a direction parallel with the ground and perpendicular with the roll axis. The yaw axis (or reference z axis) may be determined as a direction perpendicular with the ground and perpendicular with both the roll axis and the pitch axis.

The imaging device 220 may capture images of the imaged object in a desired imaging range and generate data of the captured images. The data of the images captured through the imaging of the imaging device 220 may be stored in the memory of the imaging device 220 or in the memory 160.

The imaging device 230 may capture images of the surrounding environment of the UAV 100 and generate data of the captured images. The data of the images captured by the imaging device 230 may be stored in the memory 160.

The GPS receiver 240 may receive multiple signals indicating the times and locations (coordinates) of various GPS satellites from multiple navigation satellites (i.e., the GPS satellites). The GPS receiver 240 may calculate the location of the GPS receiver 240 (i.e., the location of the UAV 100) based on the multiple received signals. The GPS receiver 240 may output the location information of the UAV 100 to the UAV controller 110. In addition, the UAV controller 110 may replace the GPS receiver 240 to perform the calculation of the location information of the GPS receiver 240. In this situation, the information indicating the times and locations of the various GPS satellites that is included in the multiple signals received by the GPS receiver 240 may be input into the UAV controller 110.

The IMU 250 may detect the attitude of the UAV 100, and may output the detection result to the UAV controller 110. The IMU 250 may detect the accelerations at three axis directions: front-back, left-right, and up-down, and the angular velocities in three axis directions: pitch axis, roll axis, and yaw axis, as the attitude of the UAV 100.

The magnetic compass 260 may detect the orientation of the head of the UAV 100, and may output the detection result to the UAV controller 110.

The barometric altimeter 270 may detect the altitude of the flight of the UAV 100, and may output the detection result to the UAV controller 110. In addition, the altitude of the flight of the UAV 100 may be detected through a sensor other than the barometric altimeter 270.

The ultrasonic sensor 280 may emit an ultrasound wave, detect an ultrasound wave reflected back by the ground and objects, and output the detection result to the UAV controller 110. The detection result may indicate the distance from the UAV 100 to the ground, i.e., the height. The detection result may also indicate the distance from the UAV 100 to the objects (e.g., the imaged object).

The laser measurement device 290 may emit a laser beam toward an object, receive the laser beam reflected by the object, and measure the distance between the UAV 100 and the object (e.g., the imaged object) based on the reflected laser beam. As an example of the laser based distance measurement method, it can be the time of flight method.

Figure 3:
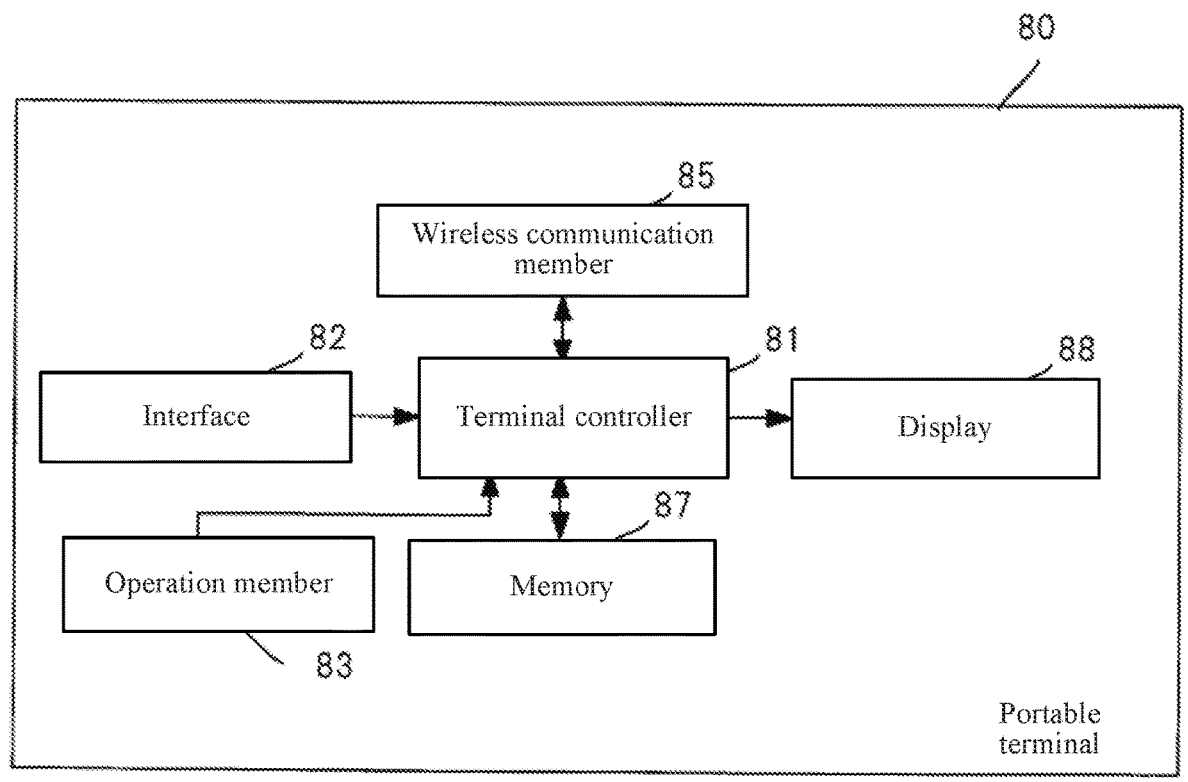
FIG. 3 is a schematic diagram of a hardware configuration of a portable terminal, according to an example embodiment.

FIG. 3 is a schematic diagram of a hardware configuration of a portable terminal 80. The portable terminal 80 may include a terminal controller 81, an interface 82, an operation member 83, a wireless communication member 85, a memory 87, and a display 88. The portable terminal 80 may be an example of an information processing device. The terminal controller 81 may be an example of a controller.

The operation member 83 may be an example of an operation member. The display 88 may be an example of a prompt member.

The terminal controller 81 may include at least one of a CPU, MPU, or DSP. The terminal controller 81 may be configured to execute signal processing for overall control of actions of various parts of the portable terminal 80, input and output processing of data with various other parts, and computational processing of data and storage processing of data.

The terminal controller 81 may be configured to obtain data and information from the UAV 100 through the wireless communication member 85. The terminal controller 81 may obtain data and information from the transmitter 50 through the interface 82. The terminal controller 81 may obtain data and information input through the operation member 83. The terminal controller 81 may obtain data and information stored in the memory 87. The terminal controller 81 may transmit data and information to the display 88, such that display information based on the data and information may be displayed on the display 88.

The terminal controller 81 may be configured to execute an aerial photography path generating application. The aerial photography path generating application may be an application for generating the aerial photography path for capturing images in aerial photography through the UAV 100. The terminal controller 81 may be configured to generate various data used in the application.

The interface 82 may execute input and output of data and information between the transmitter 50 and the portable terminal 80. The interface 82 may perform the input and output through a USB cable. The interface 82 may also be an interface other than USB.

The operation member 83 may receive data and information input by a user of the portable terminal 80. The operation member 83 may include a button, a key, a touch screen, a microphone, etc. Here only an example where the operation member 83 and the display 88 are formed by touch screens is shown. In this situation, the operation member 83 may receive a touch operation, a click operation, a drag operation, etc.

The wireless communication member 85 may perform wireless communication with the UAV 100 and the server device 90 through various wireless communication methods. The wireless communication methods may include, for example, wireless LAN, Bluetooth®, or public wireless networks.

The memory 87 may include a ROM storing a program for defining the actions of the portable terminal 80 and fixed value data, and a RAM temporarily storing various information and data to be used in various processes executed by the terminal controller 81. The memory 87 may include memories other than ROM and RAM. The memory 87 may be provided inside the portable terminal 80. The memory 87 may be configured to be detachable from the portable terminal 80. The program may include an application program.

The display 88 may be formed by, for example, a Liquid Crystal Display ("LCD"), and may be configured to display various information and data output by the terminal controller 81. The display 88 may display various data and information related to the execution of the aerial photography path generating application.

In addition, the portable terminal 80 may be mounted on the transmitter 50 through a support. The portable terminal 80 and the transmitter 50 may be connected through a wired cable (e.g., a USB cable). In some embodiments, the portable terminal 80 may not be mounted on the transmitter 50. Rather, the portable terminal 80 and the transmitter 50 may be separately provided.

Figure 4:
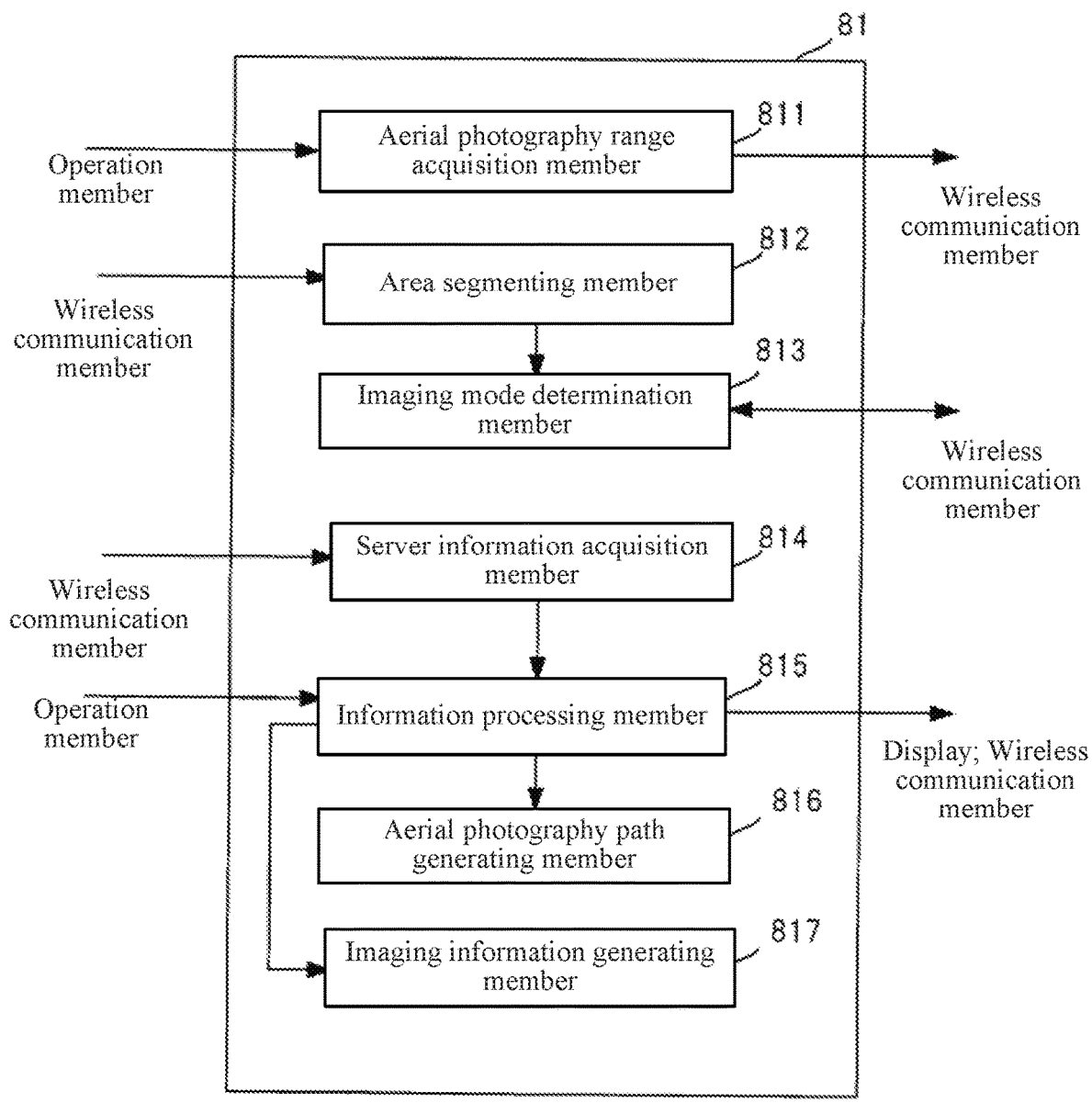
FIG. 4 is a schematic diagram of a functional configuration of a terminal controller, according to an example embodiment.

FIG. 4 is a schematic diagram of a functional configuration of the terminal controller 81. The terminal controller 81 may include an aerial photography range acquisition member 811, an area segmenting member 812, an imaging mode determination member 813, a server information acquisition member 814, an information processing member 815, an aerial photography path generating member 816, and an imaging information generating member 817. The aerial photography range acquisition member 811 may be an example of a first acquisition member. The area segmenting member 812 may be an example of a segmenting member. The imaging mode determination member 813 may be an example of a determination member. The server information acquisition member 814 may be an example of a second acquisition member. The aerial photography path generating member 816 may be an example of a generating member. The imaging information generating member 817 may be another example of the generating member. The information processing member 815 may be another example of the generating member.

The aerial photography range acquisition member 811 may obtain map information of a map DB (i.e., map image) stored by an external server through the wireless communication member 85. The aerial photography range acquisition member 811 may display the map information through the display 88, to select an aerial photography range through touch operations by the operation member 83 on the map information, and to obtain information of the aerial photography range. The aerial photography range may be a range of a geographical aerial photography object that is aerially photographed through the UAV 100. The information of the aerial photography range may include information of detailed two-dimensional locations (e.g., values of the altitude and longitude). In addition, the information of the aerial photography range may include information indicating a geographical name of a detailed geographical location (e.g., "station yard"). The map image may be a map image indicating the aerial photography range, which may be a two-dimensional image represented by a two-dimensional space (e.g., latitude, longitude), or a three-dimensional image represented by a three-dimensional space (e.g., latitude, longitude, and altitude).

The area segmenting member 812 may perform an imaging area analysis on the obtained map image of the aerial photography range, and may segment the aerial photography range into multiple areas. The area segmenting member 812 may perform a semantic segmentation. In the semantic segmentation, the area segmenting member 812 may segment the aerial photography range into multiple areas based on each images object (e.g., mountain, sea, building, river) included in the map image in the aerial photography range, i.e., based on feature or characteristic of each imaged object. For example, each pixel value of each pixel of the map image may be consistent with each imaged object. It may be derived that: areas in which arrangements of the pixel values are the same are areas including the same imaged object. Therefore, the area segmentation may be performed based on locations where different imaged objects exist. As such, the aerial photography range may be segmented into, for example, at least two of a mountain area, a sea area, a building area, and a river area.

In addition, the image recognition performed by the area segmenting member 812 may be implemented by an external server (e.g., a map information server storing the map image). The area information of the semantic segmentation and the information of the imaged objects in the various areas stored in the memory may be obtained through the wireless communication member 85.

The imaging mode determination member 813 may determine an imaging mode for capturing aerial photography images. The imaging mode may include, for example, a mountain mode, a sea mode, a building mode, a river mode, etc. The imaging mode determination member 813 may determine the imaging mode based on occupation ratios of various segmented areas in each aerial photography range and location relationships. For example, when the UAV 100 is set for the mountain mode, the aerial photography may be performed using a mountain (which is an imaged object in the aerial photography range) as a center for the aerial photography. The imaging mode determined by the imaging mode determination member 813 adds an imaging mode for future aerial photography, so it may be referred to as a scheduled imaging mode.

The server information acquisition member 814 may obtain data and information from the server device 90 through the wireless communication member 85. The data and information obtained from the server device 90 may include information of the path shape sample of the aerial photography information transmitted based on the portable terminal 80. The server information acquisition member 814 may obtain information of the path shape sample recorded in the path shape DB991.

The information processing member 815 may process the path shape sample to generate the processing information, such that the path shape sample is suitable for the aerial photography path for imaging the imaged object in the aerial photography range. For example, the information processing member 815 may process the path shape sample for aerial photography of the mountain based on information related to the shape of the mountain, and the imaging information for aerial photographing the mountain. The information related to the shape of the mountain may include a radius of the mountain on a ground cross section, a height of the mountain, and information of other characteristic shape. The imaging information for aerial photographing the mountain may include information relating to a distance from the UAV 100 to the mountain (i.e., a distance to the imaged object), attitude of the UAV 100 and the universal support 200 used for imaging the mountain, the field of view (i.e., aerial photography field of view) of the imaging device 220 or the imaging device 230, a facing direction (i.e., aerial photography direction) of the imaging device 220 or the imaging device 230. The information processing member 815 may generate the processing information based on operations on the operation member 83.

The aerial photography path generating member 816 may generate an aerial photography included in the aerial photography range. The aerial photography generating member 816 may generate the aerial photography path for the UAV 100 to perform a future aerial photography (also referred to as a scheduled aerial photography path) based on the path shape sample and the processing information. The scheduled aerial photography path may be an example of a first aerial photography path.

The imaging information generating member 817 may generate the imaging information (also referred to as scheduled imaging information) of the imaging device 220 or the imaging device 230 when the UAV 100 flies along the scheduled aerial photography path included in the aerial photography range while performing aerial photography. The imaging information generating member 817 may generate the scheduled imaging information based on the processing information. In addition, the imaging information generating member 817 may generate the imaging information based on the imaging mode determined by the imaging mode determination member 813. That is, the imaging information may be determined based on each imaging mode, and may be stored in the memory 87. For example, the UAV 100 may perform aerial photography facing the mountain (facing a side) in the mountain mode, and may perform aerial photography facing the sea (facing the ground direction) in the sea mode.

Figure 5:
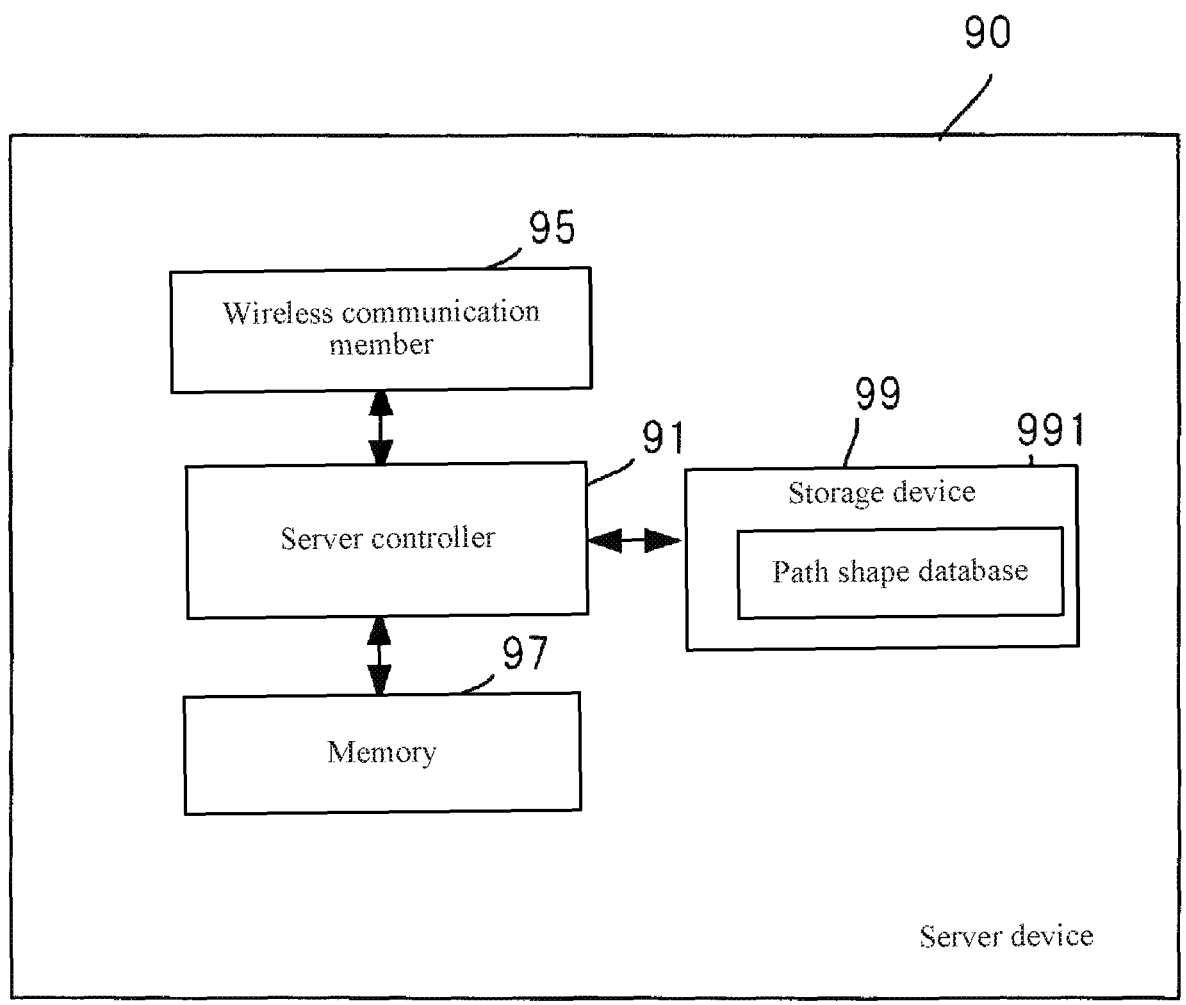
FIG. 5 is a schematic diagram of a hardware configuration of a server device, according to an example embodiment.

FIG. 5 is a schematic diagram of a hardware configuration of a server device 90. The server device 90 may include a server controller 91, a wireless communication member 95, a memory 97, and a storage device 99.

The server controller 91 may be formed by at least one of a CPU, MPU, or DSP. The server controller 91 may execute signal processing for overall control of actions of various parts of the server device 90, input and output processing of data with various other parts, and computational processing of data and storage processing of data.

The server controller 91 may obtain data and information from the UAV 100 and the portable terminal 80 through the wireless communication member 95. The server controller 91 may obtain the data and information stored at the memory 97 and the storage device 99. The server controller 91 may transmit the data and information to the portable terminal 80, and cause display information that is based on the data and information to be displayed on the display 88.

The wireless communication member 95 may communicate with the UAV 100 and the portable terminal 80 through various wireless communication methods. The wireless communication methods may include, for example, wireless LAN, Bluetooth®, or public wireless networks.

The memory 97 may include a ROM storing a program for defining the actions of the server device 90 and fixed value data, and a RAM temporarily storing various information and data to be used in various processes executed by the server controller 91. The memory 97 may include memories other than ROM and RAM. The memory 97 may be provided inside the server device 90. The memory 97 may be configured to be detachable from the server device 90.

The storage device 99 may store and save various data and information. The storage device 99 may include a path shape database ("DB") 991. The storage device 99 may include one or more of a Hard Disk Drive ("HDD"), a Solid State Drive ("SSD"), a Secure Digital card ("SD"), a USB memory, etc. The storage device 99 may be provided inside the server device 90. The storage device 99 may be configured to be detachable from the server device 90.

The path shape database 991 may store and save a path shape sample based on each imaging mode. The path shape database 991 may transmit the path shape sample to the server controller 91 based on a request from the server controller 91.

Figure 6:
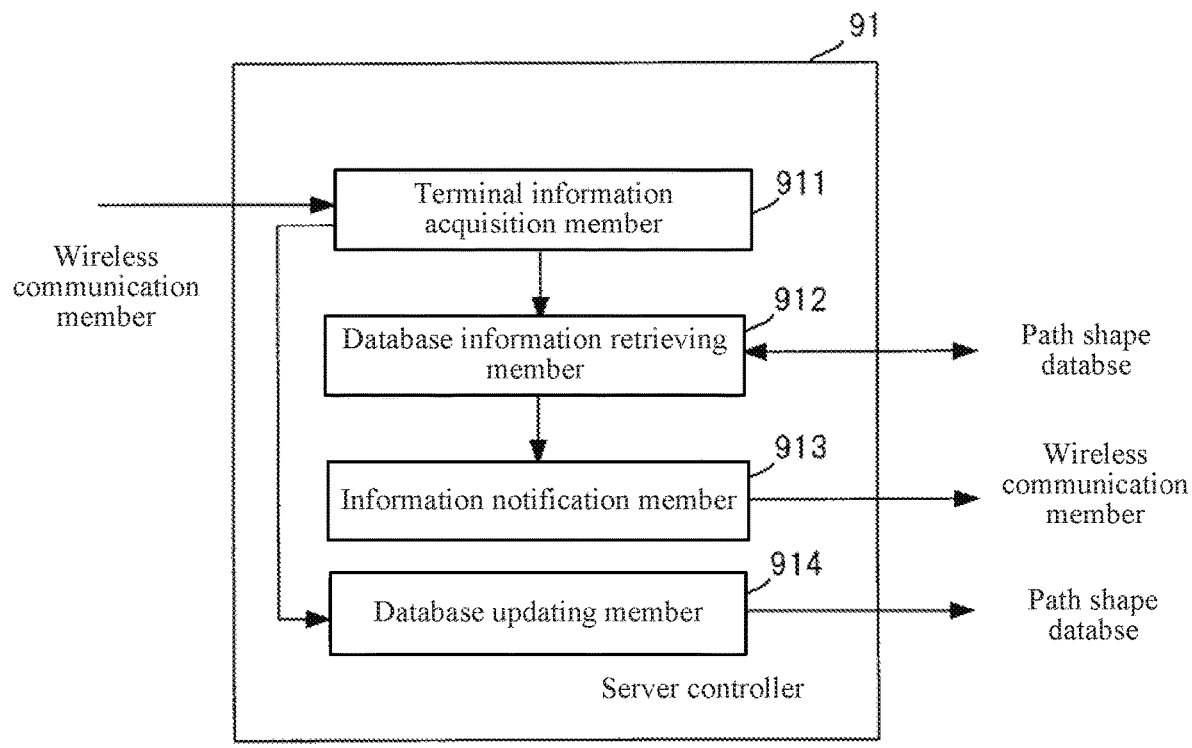
FIG. 6 is a schematic diagram of a functional configuration of a server controller, according to an example embodiment.

FIG. 6 is a schematic diagram of a functional configuration of the server device 90. The server controller 91 may include a terminal information acquisition member 911, a database information retrieving member 912, an information notification member 913, and a database updating member 914.

The terminal information acquisition member 911 may obtain information (e.g., information regarding scheduled imaging mode) from the portable terminal 80 through the wireless communication member 95.

The database information retrieving member 912 may search the path shape database 991 based on the obtained scheduled imaging mode, and may retrieve data and information from the path shape database 991. For example, the database information retrieving member 912 may use an imaging mode (e.g., a database imaging mode) corresponding to (e.g., consistent with) the scheduled imaging mode as a keyword, and may retrieve one or more path shape samples for aerial photographing an imaged object belonging to the database imaging mode.

The information notification member 913 may transmit the data and information (e.g., one or more path shape samples) retrieved from the path shape database 991 to the portable terminal 80 through the wireless communication member 95. When the database imaging mode corresponding to (e.g., consistent with) the obtained scheduled imaging mode does not exist in the path shape database 991, the information notification member 913 may notify the portable terminal 80 of the fact that the scheduled imaging mode does not exist in the path shape database 991.

The database updating member 914 may register into the path shape database 991 the information (e.g., information relating to new scheduled imaging mode, path shape) obtained through the terminal information acquisition member 911 from the portable terminal 80. The database updating member 914 may update the path shape database 991 through storing new information from the portable terminal 80.

Figure 7:
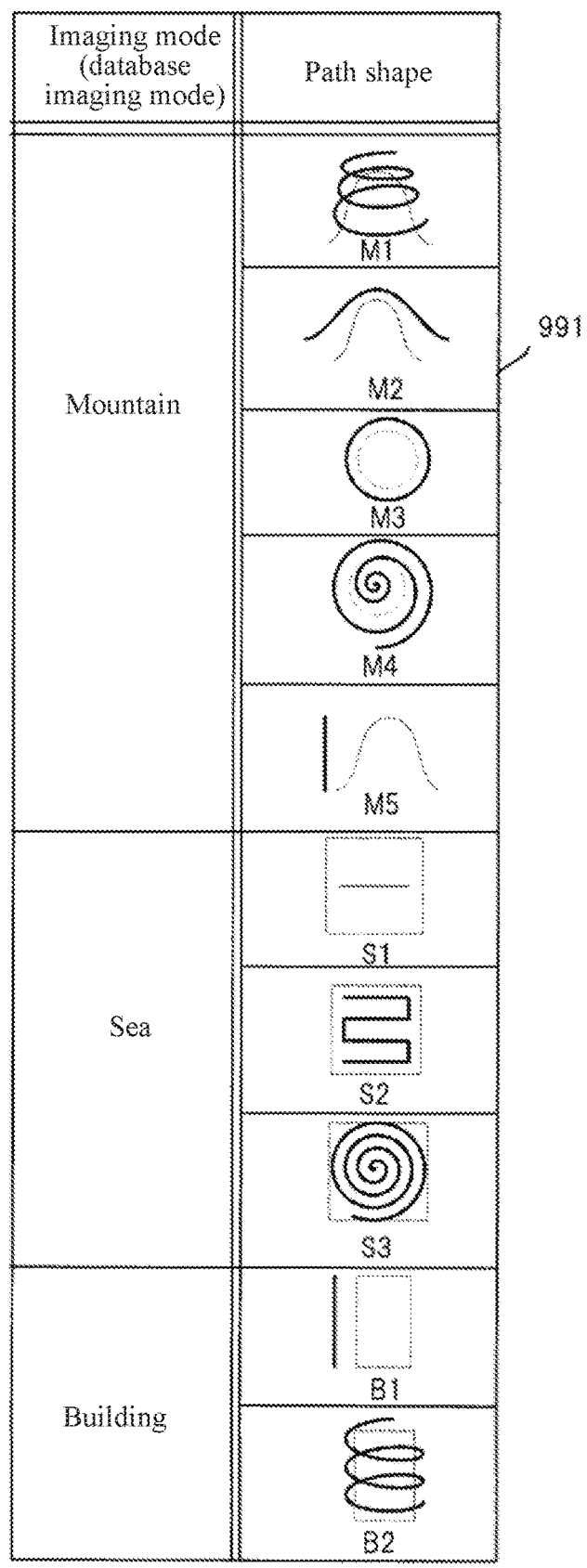
FIG. 7 is a schematic illustration of information stored in a path shape DB, according to an example embodiment.

FIG. 7 is a schematic illustration of information stored in the path shape database 991 in a table format. The path shape database 991 stores the path shape samples based on each imaging mode (e.g., database imaging mode). In FIG. 7, the imaged object (e.g., mountain, sea, building) under each imaging mode is shown in dashed line, and the path shape sample for aerial photographing the imaged object is shown in solid line.

In FIG. 7, in the path shape database 991, under the database imaging mode of "mountain," shapes M1~M5 have been registered. Shape M1 may indicate a shape of an aerial photography path configured for circling around an outer periphery of the mountain in a vertically helical shape. Shape M2 may indicate a shape of the aerial photography path configured for flying along a ridge of the mountain. Shape M3 may indicate a shape of an aerial photographing path configured for flying at the space above the mountain for a circle at the same height. Shape M4 may indicate a shape of the aerial photography path configured for circling in a horizontally spiral shape in the space about the mountain at the same height. Shape M5 may indicate a shape of the aerial photography path configured for flying in a gravity direction at a side of the mountain. In addition, figures showing shapes M1, M2, M5 are from a perspective observing the mountain from a side of the mountain, and figures showing shapes M3, M4 are from a perspective observing the mountain from above the mountain.

In FIG. 7, in the path shape database 991, under the database imaging mode of "sea," shapes S1~S3 have been registered. Shape S1 may indicate a shape of the aerial photography path configured for flying in the same direction at the same height in the space above the sea. Shape S2 may indicate a shape of the aerial photography path configured for flying a round trip in straight lines at the same height in the space above the sea. Shape S3 may indicate a shape of the aerial photography path configured for circling in a horizontal spiral shape at the same height in the space above the sea. In addition, figures showing shapes S1, S2, S3 are from a perspective observing the sea from above the sea.

In FIG. 7, in the path shape database 991, under the database imaging mode of "building," the shapes B1~B3 have been registered. Shape B1 may indicate a shape of the aerial photography path configured for flying in a gravity direction at a side of the building. Shape B2 may indicate a shape of the aerial photography path configured for vertical helical circling around an outer periphery of the building. In addition, figures showing shapes B1 and B2 are from a perspective observing the building from a side of the building.

In addition, although FIG. 7 shows that the path shape sample belongs to a lower position under the database imaging mode, it is possible to have classification layers of the path shapes formed by classifying the path shape samples to a certain degree. That is, at the lower position of the database imaging mode (e.g., the mountain mode), it may exist path shape classification (e.g., spiral shape classification), and the path shape sample (e.g., shape M4) may belong to the path shape classification.

Figure 8:
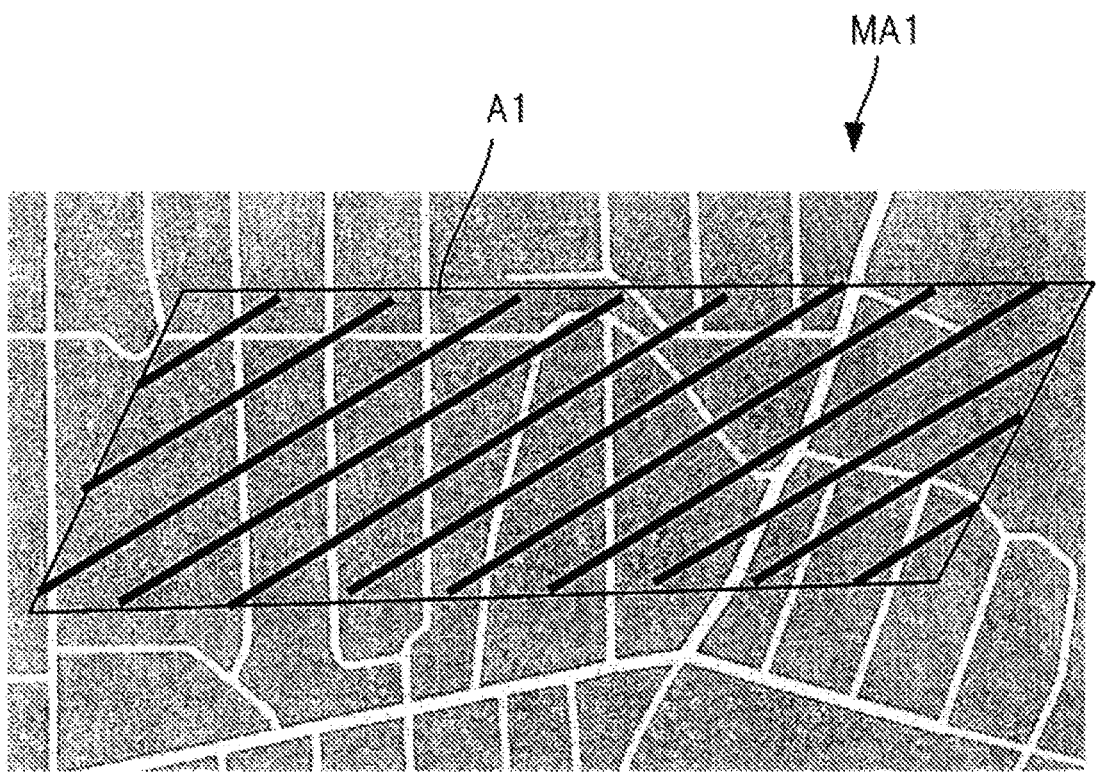
FIG. 8 is a schematic illustration of an example of inputting an aerial photography range, according to an example embodiment.

FIG. 8 illustrates input of the aerial photography range.

The portable terminal 80 may be carried by a user who has scheduled to perform aerial photography. In the portable terminal 80, information of the aerial photography range A1 may be input through the operation member 83. The operation member 83 may receive a user input a desired range for the aerial photography indicated by the map information MA1, as the aerial photography range A1. In addition, the operation member 83 may input a desired location name for the aerial photography, a building that can determine a location, and names of other information (also referred to as location name, etc.). In such situation, the aerial photography range acquisition member 811 may obtain a range indicated by location names as the aerial photography range A1, or may a scheduled range surrounding a location name (e.g., a range of 100*m* radius using the location represented by the location name as the center), as the aerial photography range A1.

Figure 9:
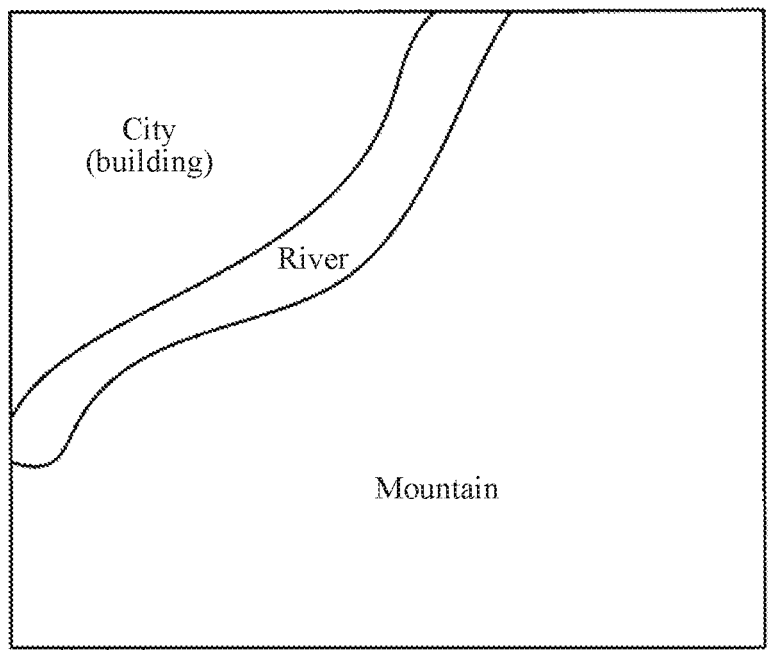
FIG. 9 is a schematic illustration of determining an imaging mode, according to an example embodiment.

FIG. 9 illustrates determining the scheduled imaging mode.

In FIG. 9, in the map image of the aerial photography range A1, mountains, rivers, and cities (buildings) are imaged. When the area segmenting member 812 performs semantic segmentation, the segmentation may result in a mountain area, a river area, a building area. In the various areas of the aerial photography range A1, the mountain area is the largest. Therefore, the imaging mode determination member 813 may determine the imaging mode used for the aerial photography in the aerial photography range A1 is a mountain mode. In addition, in some embodiments, the imaging mode may be manually selected by a user through the operation member 83.

As such, the portable terminal 80 may generate a scheduled aerial photography path suitable for the aerial photography of the representative imaged object (e.g., the mountain in the mountain mode) under the scheduled imaging mode.

In addition, the imaging mode determination member 813 may determine the scheduled imaging mode for each area segmented from the aerial photography range A1. At this moment, because FIG. 9 includes a mountain area, a river area, a building area, the imaging mode determination member 813 may determine a mountain mode for the mountain area, a river mode for the river area, and a building mode for the building area.

Figure 10:
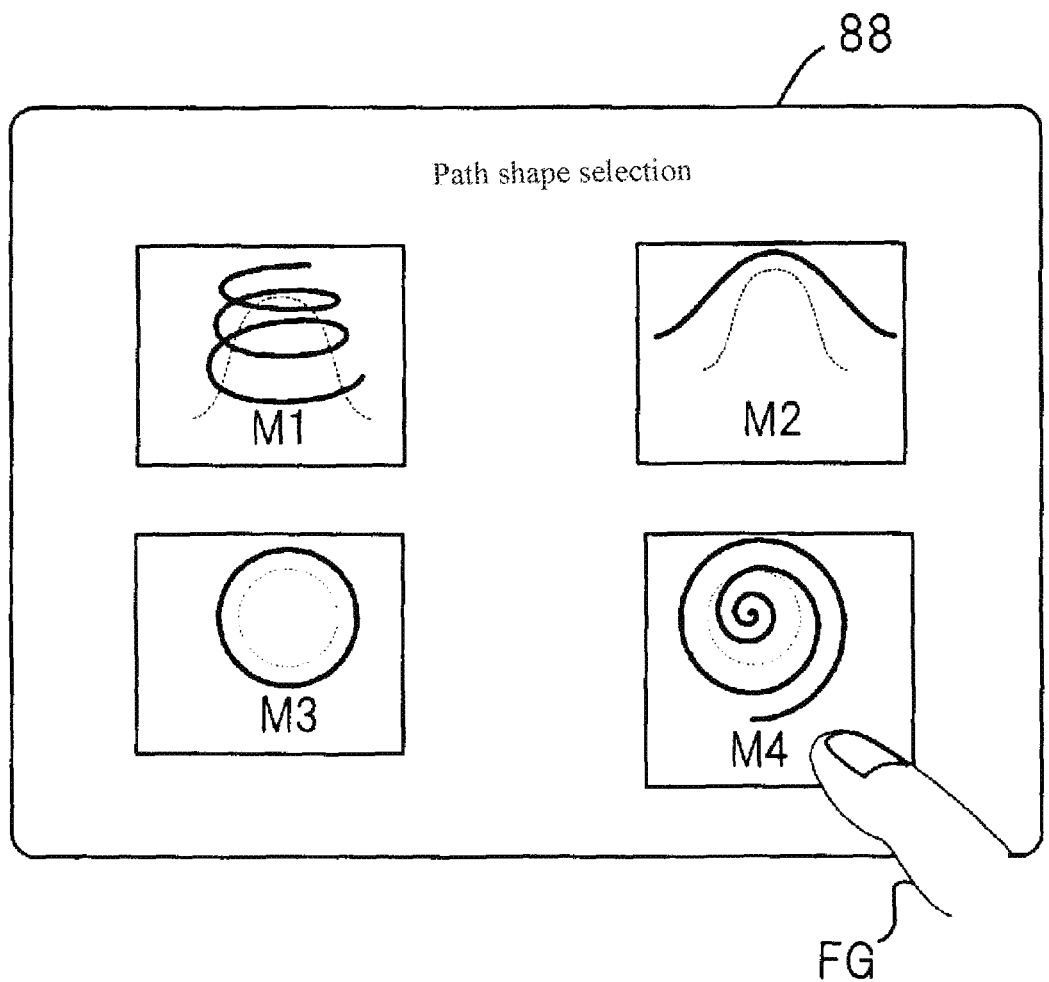
FIG. 10 is a schematic illustration of selecting a sample of a path shape, according to an example embodiment.

FIG. 10 illustrates selecting a path shape sample.

When obtaining multiple path shape samples through the server information acquisition member 814, the display 88 may display these path shape samples. The user of the portable terminal 80 may confirm the display by the display 88, and may select any path shape sample from the multiple path shape samples through the operation member 83. In addition, when obtaining a path shape sample through the server information acquisition member 814, the portable terminal 80 may not execute the selection operation shown in FIG. 10, but may determine the obtained path shape sample as the path shape sample to be used in aerial photography assistance. In addition, the portable terminal 80 may input selection information or selection instruction for the path shape selected by the user, to obtain the selected path shape.

The portable terminal 80 may determine a path shape based on a combination of the imaged object in the user desired aerial photography range A1 and the user's desire. As such, when the user desires to capture images of the desired imaged object (e.g., mountain), even when the user has no knowledge about aerial photography path suitable for aerial photography of the imaged object, the user may determine, in a simple manner, the path shape for the aerial photography that is prepared as a sample.

Figure 11:
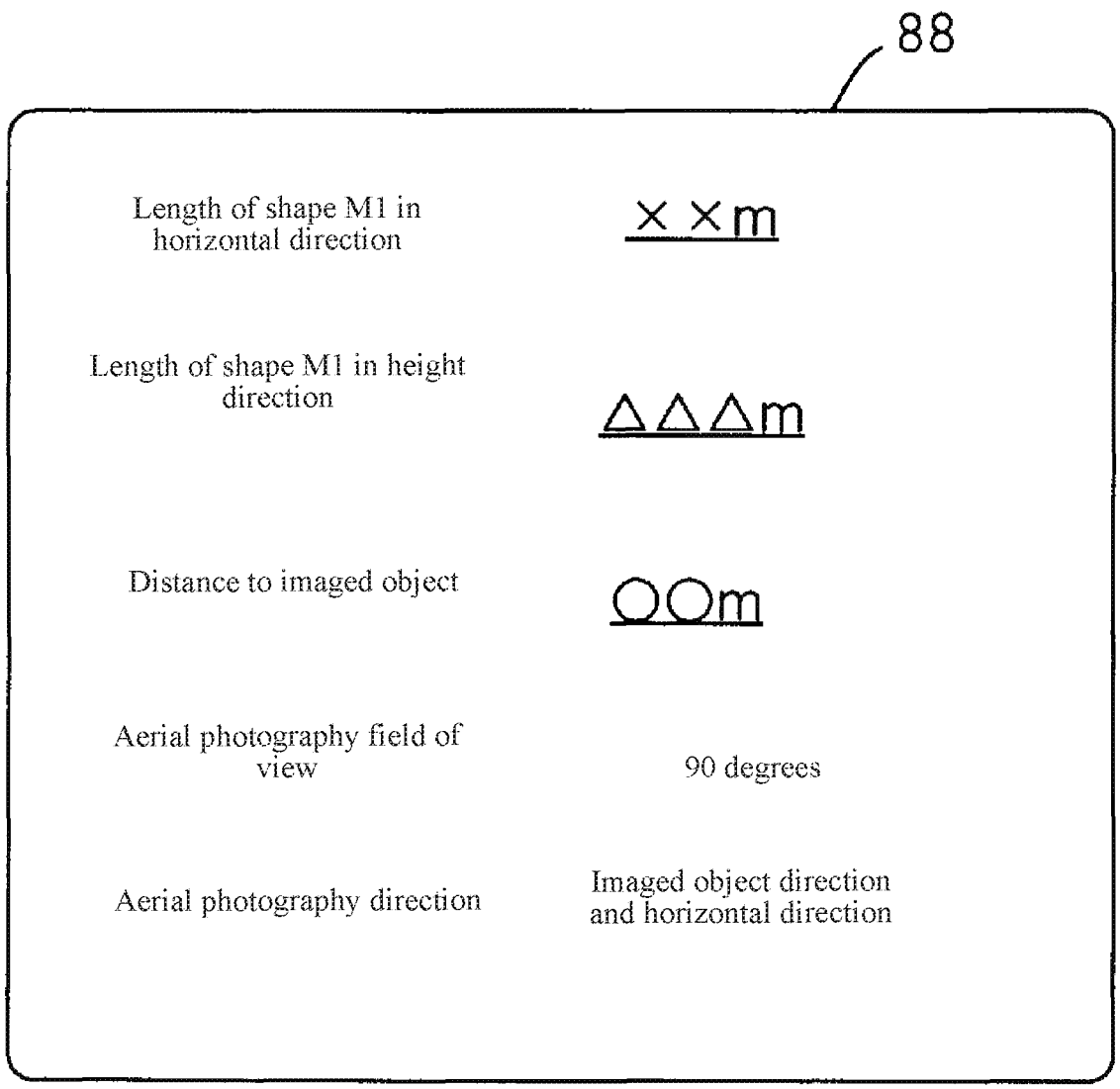
FIG. 11 is a schematic illustration of generating processing information, according to an example embodiment.

FIG. 11 illustrates generating a parameter (e.g., processing information) other than the path shape.

In order to input the processing information, display 88 may display various parameters included in the processing information. Here, it is assumed that the shape M1 in the mountain mode is the path shape sample. In FIG. 11, the shape M1 is marked as the vertically helical shape. In FIG. 11, information relating to a length of the shape M1 in the horizontal direction (equivalent to a diameter in the horizontal direction), a length of the shape M1 in the height direction, a distance with the imaged object, an aerial photography field of view, and an aerial photography direction may be used as an input object. The user of the portable terminal 80 may input, through the operation member 83, information of various parameters that are the input objects. In some embodiments, parameters other than the parameters shown in FIG. 11 (e.g., which direction is the traveling direction of the UAV 100 under the shape M1, to what degree the height is changed when a circle is completed in the helical shape M1) as the input objects.

As such, the portable terminal 80 may partially process the universally determined path shapes, and may generate an aerial photography path in combination with an actual imaged object exists in the aerial photography range. Therefore, in the same mountain mode that is a scheduled imaging mode, although shapes and heights of different mountains may be different, the path shape may be processed based on the processing information and the desired imaged object. In addition, based on user input through the operation member 83, the processing information may be generated. The user's desire may be reflected, and the aerial photography path may be generated.

In addition, the generation of the processing information may not be based on the user input. For example, information related to the mountain may be at least some information extracted from the map information, and may be used as the processing information.

Figure 12:
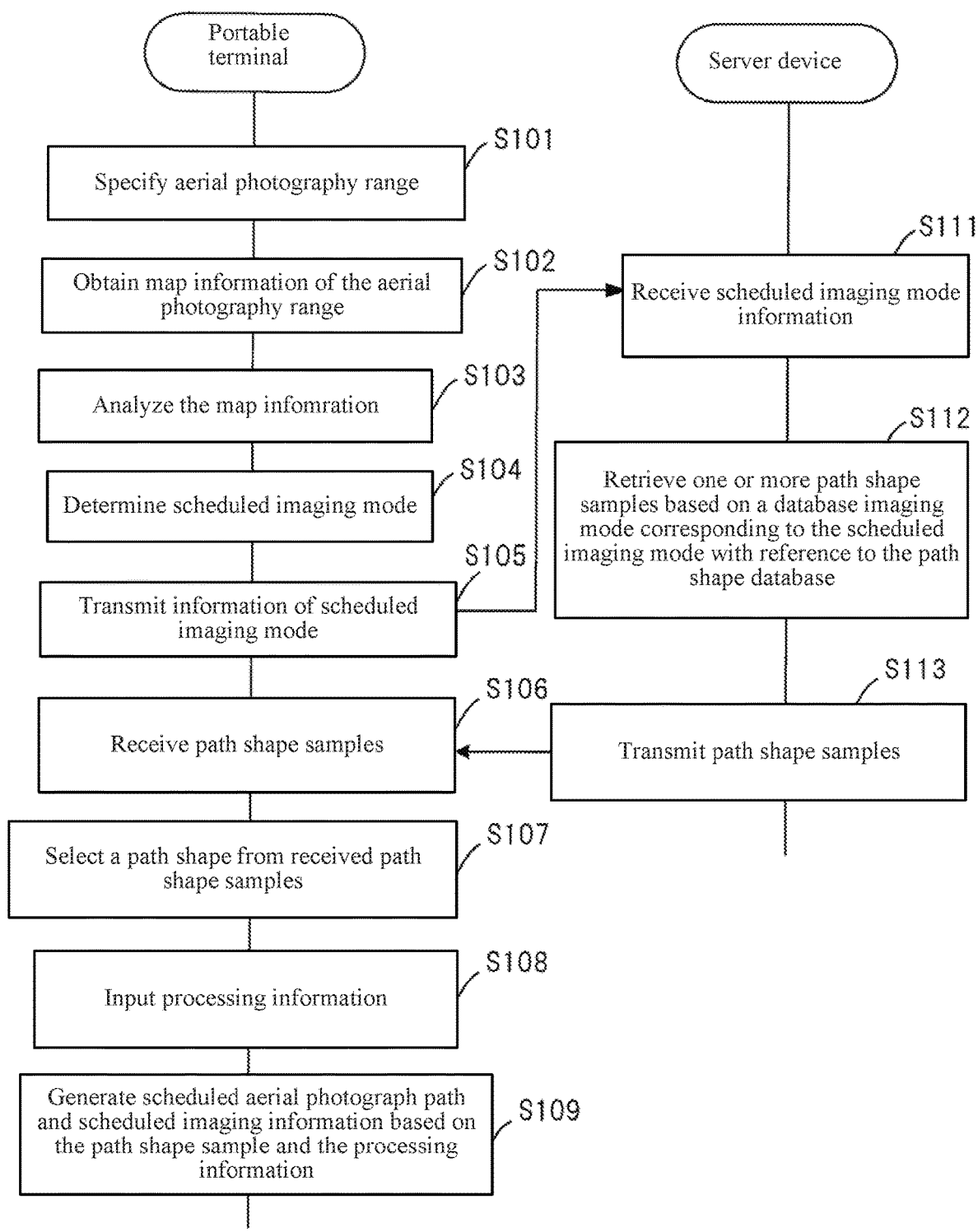
FIG. 12 is a flow chart illustrating actions for generating a scheduled aerial photography path performed by an aerial photography path generating system, according to an example embodiment.

FIG. 12 is a flow chart illustrating actions for generating the scheduled aerial photography path performed by the aerial photography path generating system 10. Here, it is assumed that in the path shape database 991, there exists a path shape sample under the database imaging mode corresponding to the scheduled imaging mode of the portable terminal 80.

First, in the portable terminal 80, the operation member 83 may receive an input specifying an aerial photography range A1 (S101). The aerial photography range acquisition member 811 may obtain the map information of the aerial photography range (S102). The area segmenting member 812 may analyze the map information, and may perform semantic segmentation (S103). The imaging mode determination member 104 may determine a scheduled imaging mode based on areas resulting from the segmentation of the aerial photography range (S104). The wireless communication member 85 may transmit the determination results of the scheduled imaging mode (i.e., information of the scheduled imaging mode) to the server device 90 (S105).

In the server device 90, the terminal information acquisition member 911 may receive information of the scheduled imaging mode (S111). The database information retrieving member 912 may refer to the path shape database 991 to retrieve one or more path shape samples belonging to the database imaging mode corresponding to the scheduled imaging mode (S112). The information notification member 913 may transmit the retrieved path shape sample to the portable terminal 80 through the wireless communication member 95 (S113).

In the portable terminal 80, the server information acquisition member 814 may obtain a path shape sample from the server device 90 through the wireless communication member 85 (S106). The operation member 83 may receive an operation for selecting a path shape sample from the obtained multiple path shape samples (S107). The information processing member 815 may input other parameters other than the path shape through the operation member 83, i.e., at least a portion of the processing information (S108). The aerial photography path generating member 816 may generate a scheduled aerial photography path based on a selected path shape sample and the input processing information (S109). The imaging information generating member 817 may generate the scheduled imaging information (S109) based on the input processing information. The generated scheduled aerial photography path and the scheduled imaging information may be transmitted to the UAV 100, and may be set as the aerial photography path and the imaging information on the UAV 100.

According to the actions shown in FIG. 12, the portable terminal 80 and the aerial photography path generating system 10 may generate an aerial photography path based on pre-registered path shape samples. Therefore, even if in the past aerial photography has not been performed in a field that the user desires to perform aerial photography through the UAV 100, the portable terminal 80 and the aerial photography path generating system 10 may obtain aerial photography patterns from changes in the aerial photography patterns indicated by some path shapes that match the shape of the imaged object that is consistent with the imaging mode (e.g., mountain mode, sea mode). Therefore, the user does not need to perform manual test imaging, searching for a desired aerial photography path in order to obtain attractive aerial photography images in a desired field. As such, the portable terminal 80 and the aerial photography path generating system 10 may reduce the complexity of the user operations and improve the convenience for the user. In addition, because test imaging is not needed for the portable terminal 80 and the aerial photography path generating system 10, situations that may occur during the test imaging, such as the UAV 100 colliding with some objects, or crashing, may be reduced, thereby enhancing the safety of the UAV 100 during flight.

In addition, a situation is examined where the imaging mode determination member 813 determines multiple scheduled imaging modes for each area. In this situation, in S104, the imaging mode determination member 813 may determine that multiple scheduled imaging modes exist. In S105, the wireless communication member 85 may transmit information of multiple scheduled imaging modes. In S111, the wireless communication member 95 may receive information of multiple scheduled imaging modes. In S112, the database information retrieving member 912 may retrieve, from the path shape database 991, each of the multiple path shape samples based on each of the multiple scheduled imaging modes. In S113, the wireless communication member 95 may transmit information of each path shape. In S106, the wireless communication member 95 may receive information of each path shape. In S109, the aerial photography path generating member 816 may generate a portion of each aerial photography path based on each path shape. In addition, the aerial photography path generating member 816 may connect a portion of each aerial photography path to generate an aerial photography path.

As such, the portable terminal 80 and the aerial photography path generating system 10 may continuously aerial photographing the imaged object existing in the aerial photography range, thereby improving the efficiency of aerial photography. In addition, the portable terminal 80 may generate various parts of an aerial photography path from the path shape samples that are suitable for various imaged objects. Therefore, the portable terminal 80 may obtain a portion of the aerial photography path suitable for various imaged objects, and may provide an aerial photography path suitable for the aerial photography in the aerial photography range as the overall aerial photography path. In addition, multiple imaging information may be generated corresponding to various portions of the aerial photography path.

Next, the situation of registering imaging modes and path shape samples in the path shape database 991 will be described.

Figure 13:
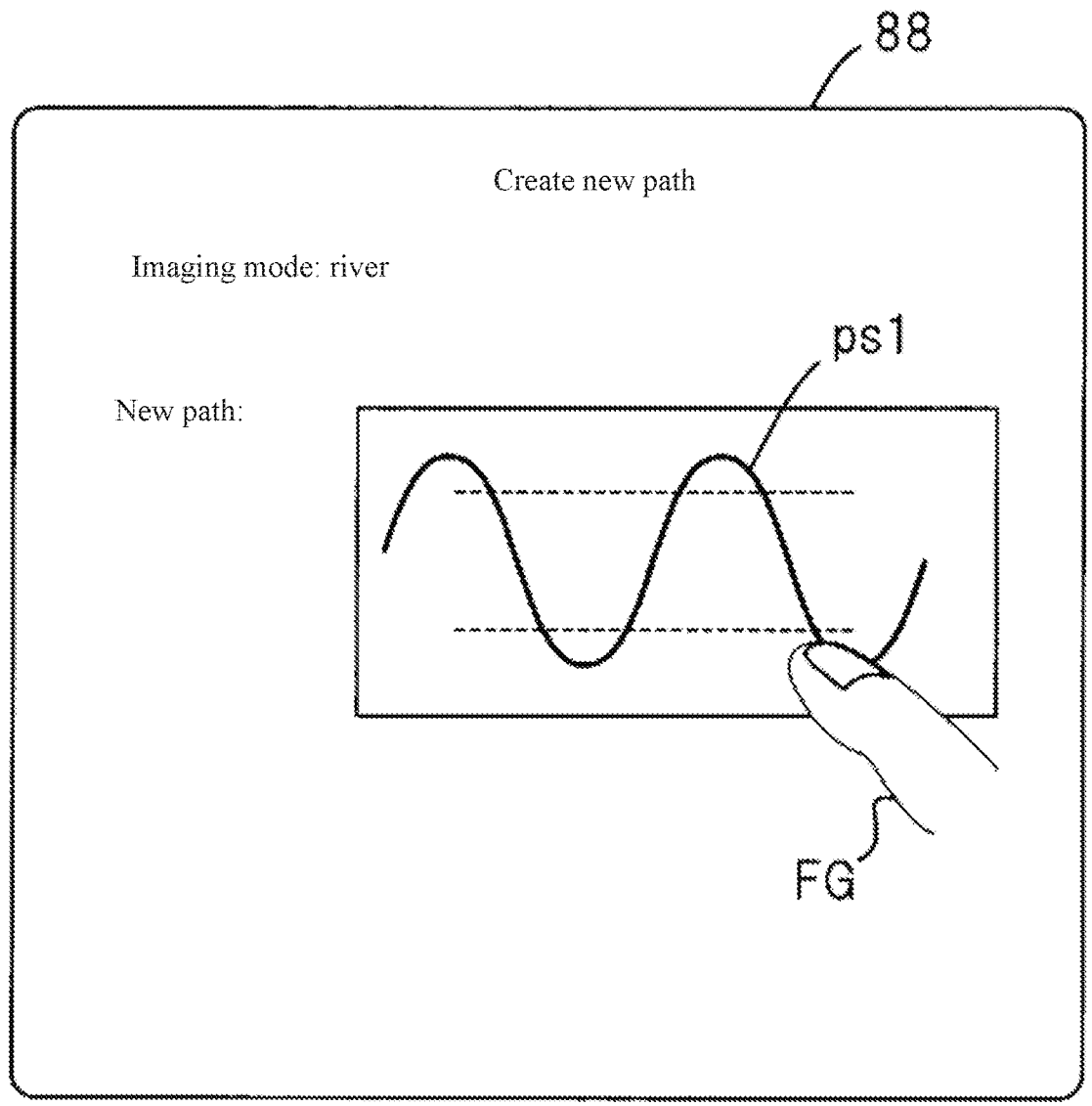
FIG. 13 is a schematic illustration of generating a new sample of a path shape, according to an example embodiment.

FIG. 13 illustrates generating a new path shape.

FIG. 13 illustrates generating a new path shape for a scheduled imaging mode "river." In FIG. 13, the display 88 displays an interface for generating a new path. The information processing member 815 receives an input from a user's figure FG through the operation member 83, and generates a path shape ps1. The wireless communication member 85 may transmit information of the scheduled imaging mode and information of the path shape ps1. In the server device 90, the wireless communication member 95 may receive the information of the scheduled imaging mode and the information of the path shape ps1.

The status of the path shape database 991 prior to adding a new path shape sample is set as that shown in FIG. 7. In this situation, because the path shape database 991 does not include a database imaging mode "river," the database updating member 914 may newly register information of the database imaging mode "river," newly register the path shape ps1, as a new path shape sample for the database imaging mode "river."

In addition, the portable terminal 80 may be set to generate a new path shape for the scheduled imaging mode "mountain." In this situation, the path shape database 991 already includes the database imaging mode "mountain." Therefore, the database updating member 914 newly register the path shape generated by the portable terminal 80, as a new path shape sample belonging to the existing database imaging mode "mountain."

As such, the portable terminal 80 may receive, through the operation member 83, an input from the user a path shape for the aerial photography in a desired scheduled imaging mode, and may generate a new path shape. Therefore, even if the database imaging modes and the path shape samples are insufficient in the path shape database 991, the portable terminal 80 may add desired imaging mode(s) and path shape(s).

Figure 14:
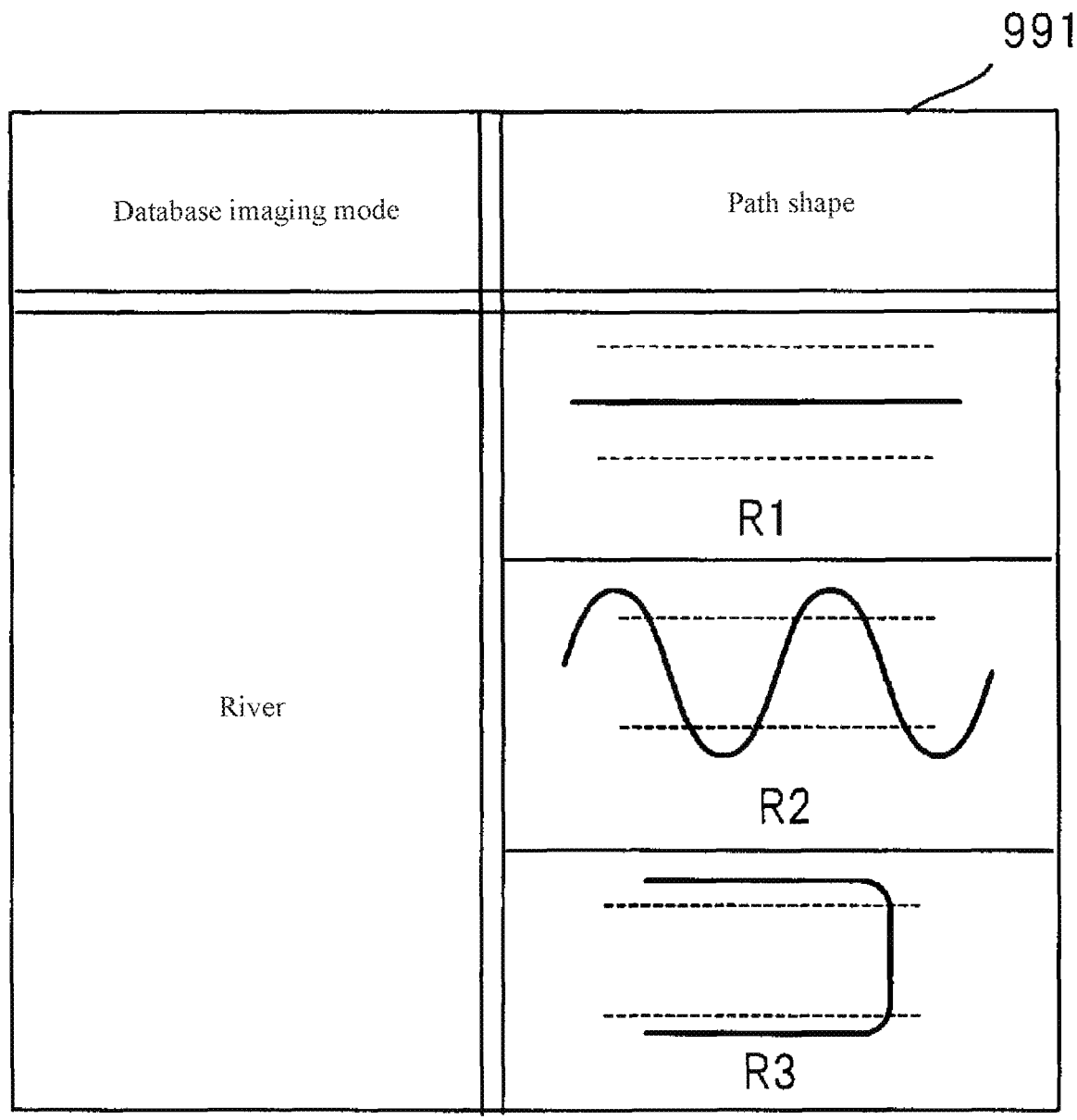
FIG. 14 is a schematic illustration of performing a new registration of a path shape DB, according to an example embodiment.

FIG. 14 illustrates new registration in the path shape database 991. In addition, FIG. 14 omitted existing records of registered information.

When the information of the scheduled imaging mode obtained from the portable terminal 80 does not exist in the path shape database 991, the database updating member 914 may register the information as a new database imaging mode. In addition, when the information of the path shape obtained from the portable terminal 80 does not exist in the path shape database 991, the database updating member 914 may register the information as a new path shape sample.

In addition, when the information of the scheduled imaging mode obtained from the portable terminal 80 exists in the path shape database 991, and when the information of the path shape obtained from the portable terminal 80 does not exist in the path shape database 991, the database updating member 914 may register the information of the path shape as a new path shape sample of an existing database imaging mode corresponding to the scheduled imaging mode.

In FIG. 14, a new database imaging mode "river" has been registered. In addition, in the database imaging mode "river," shapes R1~R3 have been registered. Shape R1 may indicate a shape of an aerial photography path configured for flying along a river. Shape R2 may indicate a shape of an aerial photography path configured for flying along the river and flying back and forth between two banks of the river. Shape R3 may indicate a shape of an aerial photography path configured for flying in a single direction along a bank at one side of the river and for flying in an opposite direction along another bank at the other side of the river. In addition, the figures showing shapes R1, R2, and R3 are from a perspective of observing the river from above the river.

Figure 15:
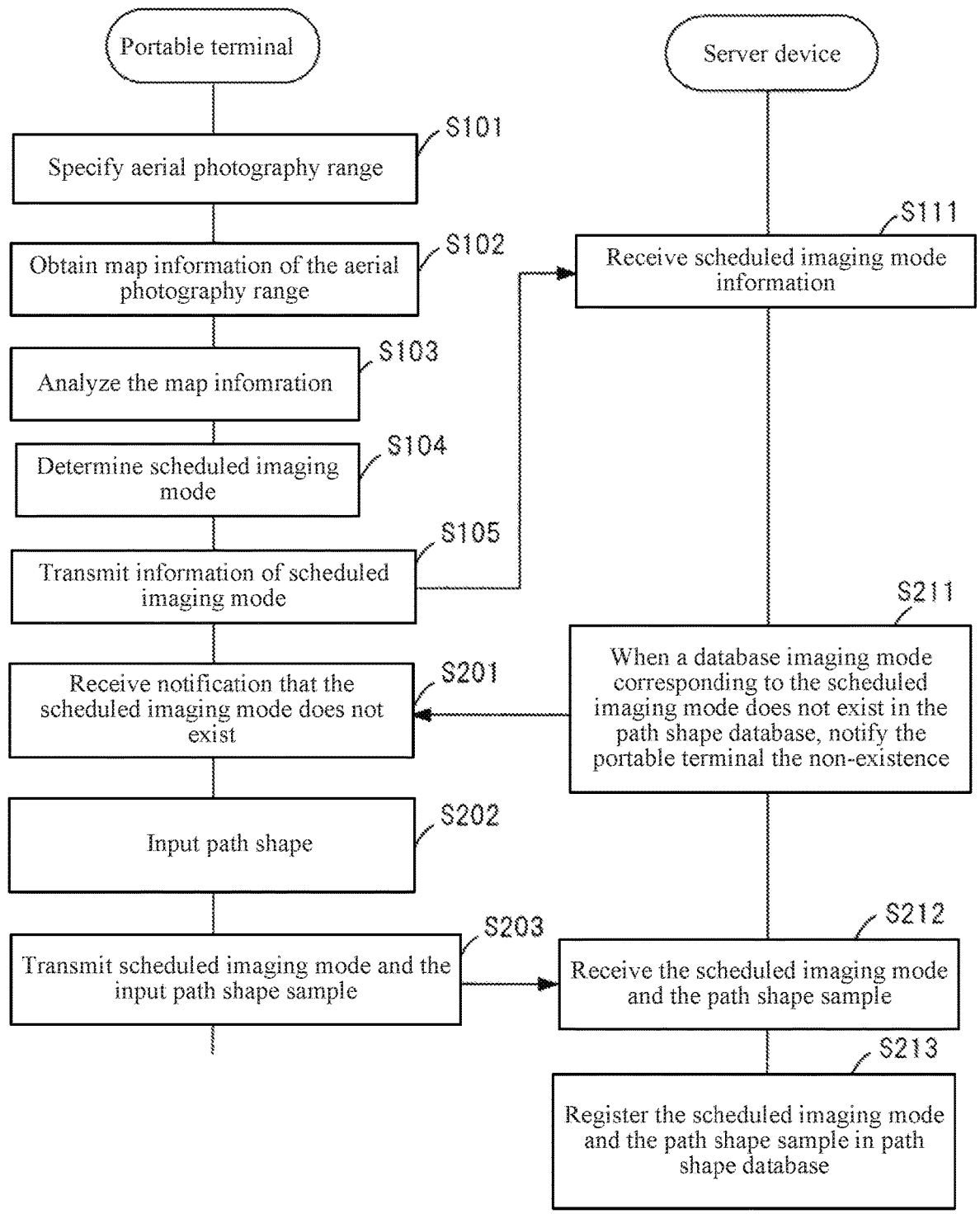
FIG. 15 is a flow chart illustrating actions for performing a new registration for a path shape DB by an aerial photography path generating system, according to an example embodiment.

FIG. 15 is a flow chart illustrating actions for registering information in the path shape database 991 performed by the aerial photography path generating system 10. In FIG. 15, it is assumed that when the portable terminal 80 is about to generate the aerial photography path, the database imaging mode corresponding to the scheduled imaging mode does not exist in the path shape database 991. In addition, the aerial photography path generating system 10 may register new imaging mode(s) and path shape(s) independent of generating the aerial photography path. In FIG. 15, the same step numbers are assigned to steps that are the same as those shown in FIG. 12, and descriptions of such steps are either omitted or simplified.

First, in the portable terminal 80, the terminal controller 81 may execute the processes of S101~S105. In the server device 90, the server controller 91 may execute the process of S111.

In the server device 90, the database information retrieving member 912 may refer to the path shape database 991, and determine whether there exist a database imaging mode corresponding to the scheduled imaging mode. When the database imaging mode corresponding to the scheduled imaging mode does not exist in the path shape database 991, the information notification member 913 may notify the portable terminal 80 that the scheduled imaging mode does not exist in the path shape database 991 through the wireless communication member 95 (S211).

In the portable terminal 80, the wireless communication member 85 may receive the notification that the scheduled imaging mode does not exist in the path shape database 991 (S201). In this situation, the display 88 may display content indicating that the scheduled imaging mode does not exist in the path shape database 991, and may display an interface for generating a new path. The information processing member 815 may receive, through the operation member 83, an input relating to a new path shape of the scheduled imaging mode, and may generate information relating to the new path shape (S202). The wireless communication member 85 may transmit the scheduled imaging mode and the generated information of the path shape to the server device 90 (S203). That is, the terminal controller 81 may control through the wireless communication member 85 to register the scheduled imaging mode and the generated information of the path shape in the path shape database 991. In addition, the content indicating that the scheduled imaging mode does not exist in the path shape database 991 may not be displayed, but rather, may be output as a voice from the portable terminal 80, or may be indicated through vibration.

In the server device 90, the terminal information acquisition member 911 may receive the scheduled imaging mode and information of the path shape through the wireless communication member 95 (S212). The database updating member 914 may determine the received scheduled imaging mode as the new database imaging mode, determine the received information of the path shape as a path shape sample belonging to the new database imaging mode, and newly register the new database imaging mode and the path shape sample in the path shape database 991 (S213).

According to the actions shown in FIG. 15, even when the information of the database imaging mode and the path shape samples recorded in the path shape database 991 are insufficient, the portable terminal 80 and the aerial photography path generating system 10 may notify such fact to the user of the portable terminal 80 and an administrator of the server device 90. Therefore, using an information processing device such as the portable terminal 80 may compensate for the insufficient of the numbers of the database imaging modes and the path shape samples. Accordingly, issues may be suppressed where assistance cannot be provided to generating the aerial photography path due to the insufficiency in the database imaging modes corresponding to the scheduled imaging modes determined in the aerial photography range, or the insufficiency in the path shape samples. In addition, even when capturing images of new imaged objects that have not been photographed in the past, information of imaging mode(s) and path shape(s) may be newly registered. Therefore, useful information may be provided to the portable terminal 80 that may be configured to generate an aerial photography path from the path shape database 991 for aerial photography of the imaged object, and to generate imaging information. In addition, information processing devices other than the portable terminal 80 may be used. For example, the administrator of the server device 90 may use a personal computer to add the path shape sample(s).

In addition, the information processing devices (e.g., the transmitter 50, the UAV 100, the personal computer, and other information processing devices) other than the portable terminal 80 may include the aerial photography assistance functions (e.g., the aerial photography path generating function, the imaging information generating function) included in the portable terminal 80.

In the embodiment described above, it has been illustrated generation of the aerial photography path based on the path shape sample stored in the path shape database. In the next embodiment, generation of the aerial photography path based on information other than the path shape sample that is saved in the path shape database will be described. In this embodiment, descriptions of configurations and actions that are the same as those of the above embodiment will be omitted or simplified.

Figure 16:
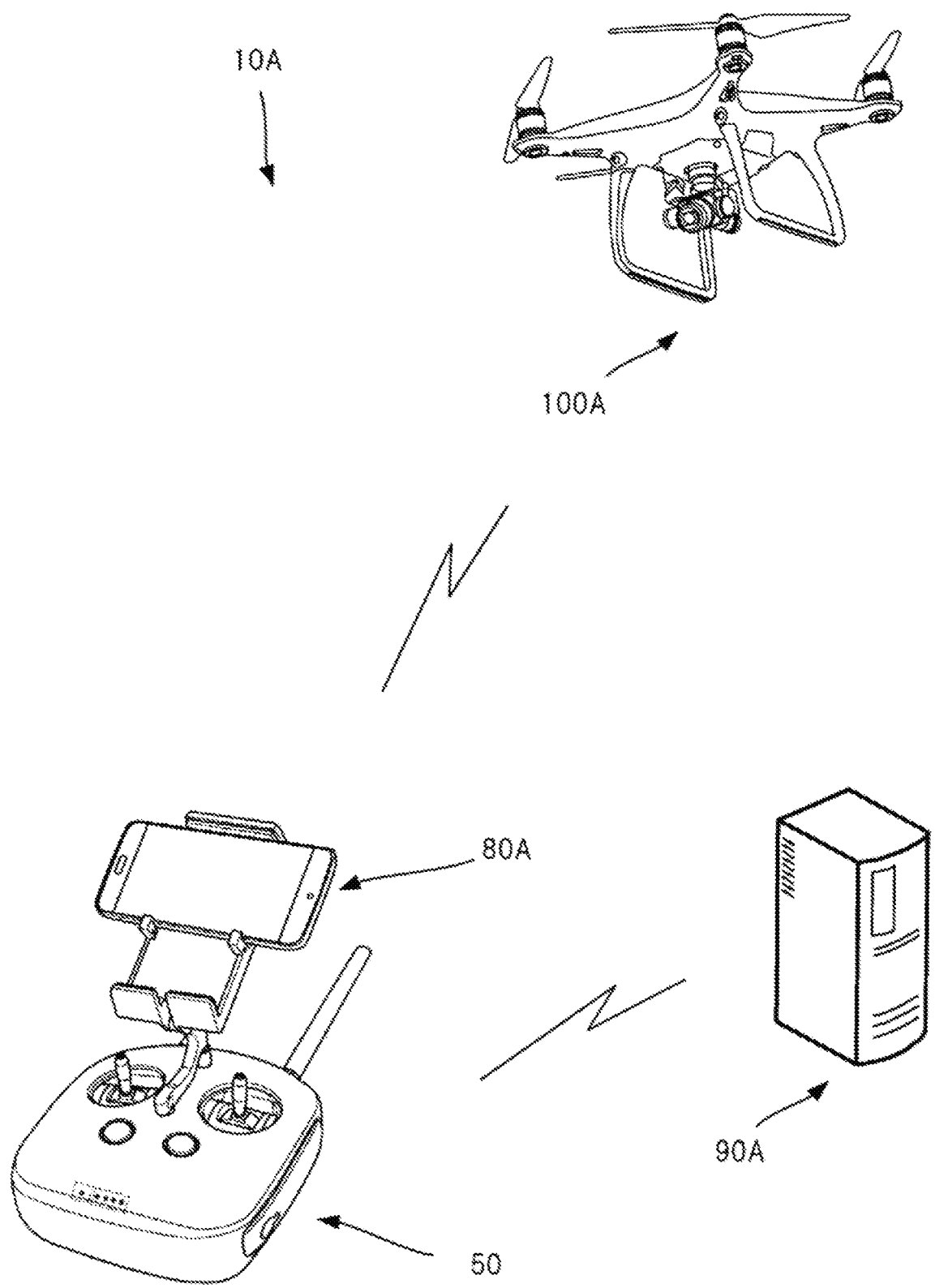
FIG. 16 is a schematic illustration of a configuration of an aerial photography path generating system, according to an example embodiment.

FIG. 16 illustrates a configuration of an aerial photography path generating system 10A. The aerial photography path generating system 10A may include one or more UAVs 100A, the transmitter 50, a portable terminal 80A, and a server device 90a. The UAV 100, the transmitter 50, the portable terminal 80A, and the server device 90A may communicate with one another through a wired communication or a wireless communication (e.g., wireless LAN).

Figure 17:
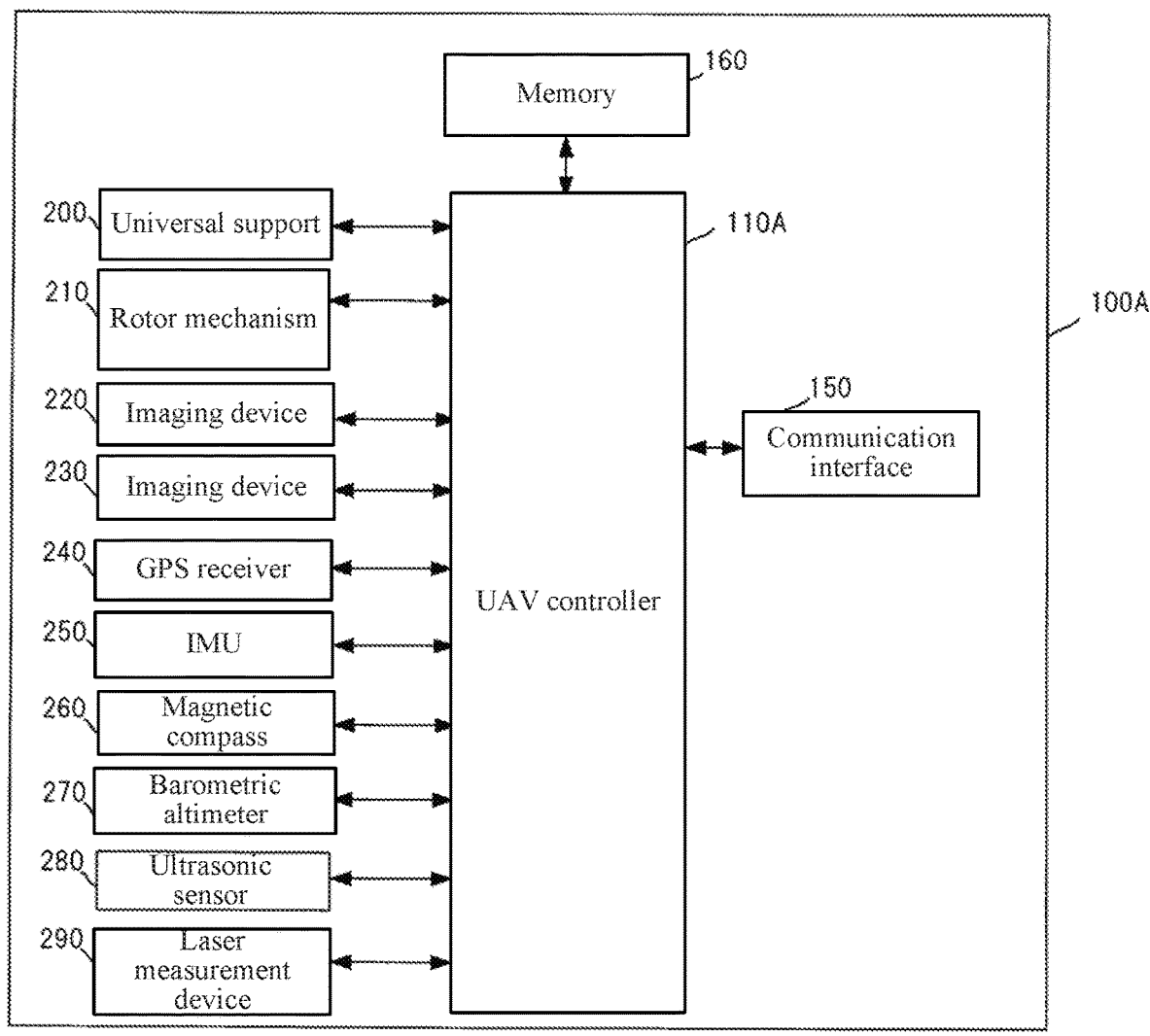
FIG. 17 is a schematic diagram of a hardware configuration of a UAV, according to an example embodiment.

FIG. 17 is a schematic diagram of a hardware configuration of the UAV 100A. Comparing the UAV 100A with the UAV 100 in the above embodiment, a UAV controller 110A replaces the UAV controller 110.

Besides the functions included in the UAV controller 110, the UAV controller 110A also includes the following functions. The UAV controller 110A may transmit at least a portion of the aerial photography images and the appended information of the aerial photography images to the server device 90A. The aerial photography images may be images captured by the imaging device 220 or the imaging device 230 when the UAV 100A flies along a scheduled aerial photography path that is based on a path shape sample. The transmitted aerial photography images and the appended information may become data and information of objects to be registered in a path shape database 991A included in the server device 90A.

Figure 18:
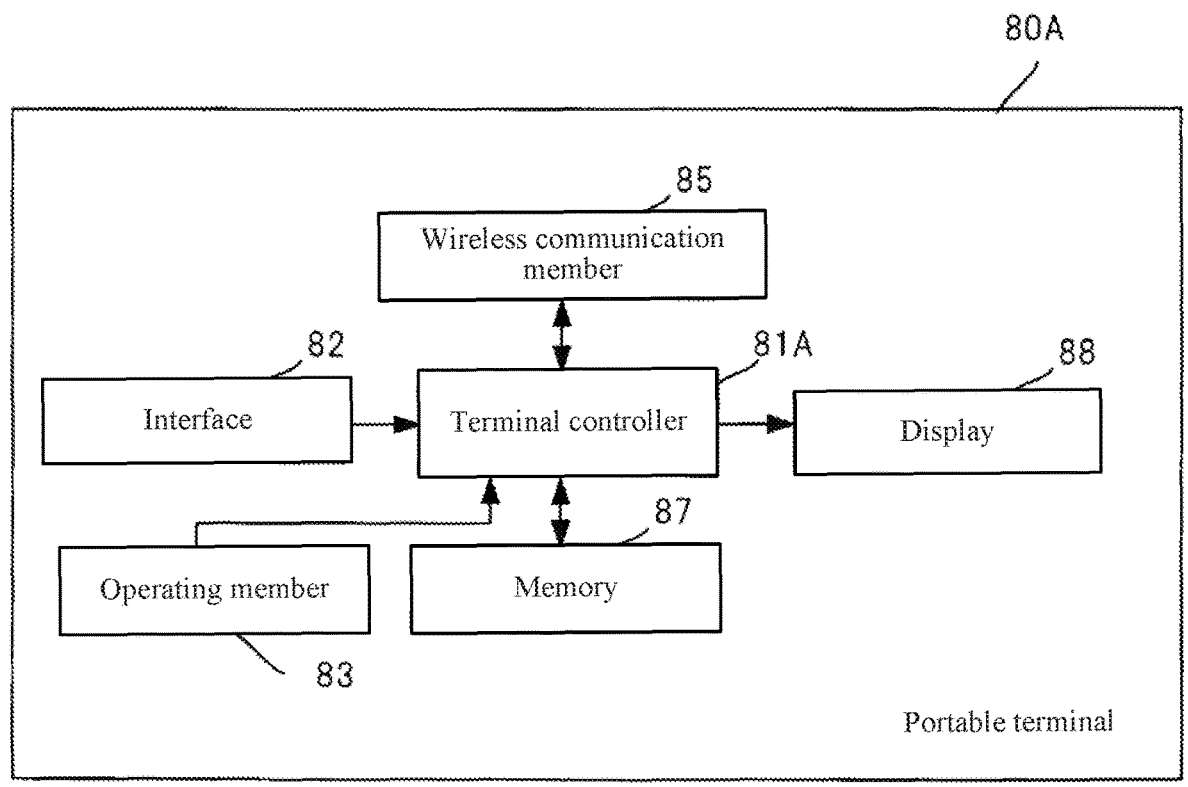
FIG. 18 is a schematic diagram of a hardware configuration of a portable terminal, according to an example embodiment.

FIG. 18 is a schematic diagram of a hardware configuration of the portable terminal 80A. Comparing the portable terminal 80A with the portable terminal 80 shown in the above embodiment, a terminal controller 81A replaces the terminal controller 81.

Figure 19:
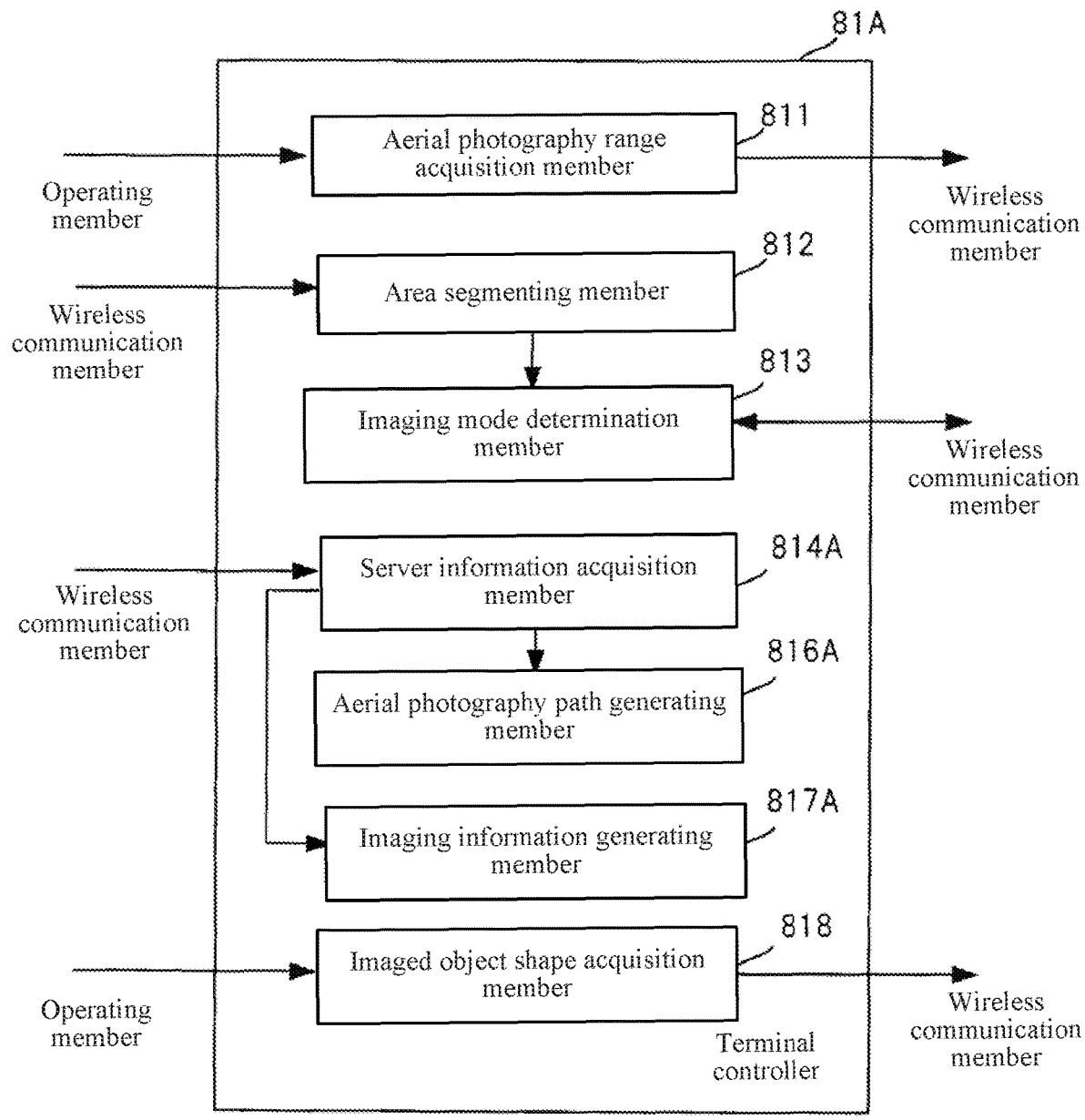
FIG. 19 is a schematic diagram of a functional configuration of a portable controller, according to an example embodiment.

FIG. 19 is a schematic diagram of a functional configuration of the terminal controller 81A. The terminal controller 81A includes the aerial photography range acquisition member 811, the area segmenting member 812, the imaging mode determination member 813, a server information acquisition member 814A, an aerial photography path generating member 816A, an imaging information generating member 817A, and an imaged object shape acquisition member 818. The imaged object shape acquisition member 818 may be an example of the segmenting member. In the terminal controller 81A shown in FIG. 19, the configurations that are the same as those of the terminal controller 81 shown in FIG. 4 are assigned with the same labels, and the descriptions of which are omitted or simplified.

The server information acquisition member 814A may include functions of the server information acquisition member 814. In addition, the server information acquisition member 814A may obtain, through the wireless communication member 85, at least a portion of the appended information related to the aerial photography images captured in the aerial photography along an aerial photography path based on a path shape sample. The appended information obtained by the server information acquisition member 814A may include imaging information when the aerial photography images are captured (also referred to as historical imaging information) that is recorded in the path shape database 991A. As described above, the historical imaging information may include at least one of aerial photography field of view information, aerial photography direction information, aerial photography attitude information, aerial photography range information when the aerial photography images are captured in aerial photography.

The aerial photography path generating member 816A may generate a scheduled aerial photography path based on at least a portion of the information of the path shape sample and the appended information obtained from the server device 90A. In addition, to provide assistance to at least a portion of the obtained appended information, the previously-described processing information may be generated through the information processing member 815 (not shown). In this situation, the aerial photography path generating member 816A may generate an aerial photography path based on at least a portion of the information of the path shape sample and the appended information, and based on the processing information.

The imaging information generating member 817A may generate scheduled imaging information based on at least a portion of the imaging information included in the appended information obtained from the server device 90A. In addition, in order to provide assistance to the at least a portion of the obtained appended information, the processing information related to the imaging information may be generated through the information processing member 815 (not shown). In this situation, the aerial photography path generating member 816A may generate scheduled imaging information based on at least a portion of the imaging information included in the appended information and based on the processing information.

The imaged object shape acquisition member 818 may obtain information of the shape (also referred to as the imaged object shape) of the imaged object included I the aerial photography range (e.g., the main imaged object (e.g., mountain) in the determined imaging mode). The imaged object shape obtained by the imaged object shape acquisition member 818 is the shape of the imaged object to be aerial photographed, also referred to as scheduled imaged object shape. The imaged object shape may be planar two-dimensional shape data such as planar map data, or may be three-dimensional shape data. When the imaged object shape is a two-dimensional shape, the two-dimensional shape data of the imaged object may be obtained from an external server (e.g., a two-dimensional map database). The two-dimensional shape data may include information relating to the latitude and longitude of the location of the imaged object. When the imaged object is a three-dimensional shape, the three-dimensional shape data of the imaged object shape may be obtained from an external server (e.g., a three-dimensional map database). The three-dimensional shape data may include information relating to the latitude, longitude, and altitude of the imaged object. The information relating to the latitude, longitude, and altitude may be obtained from the same external server, or may be obtained from two or more different external servers.

Figure 20:
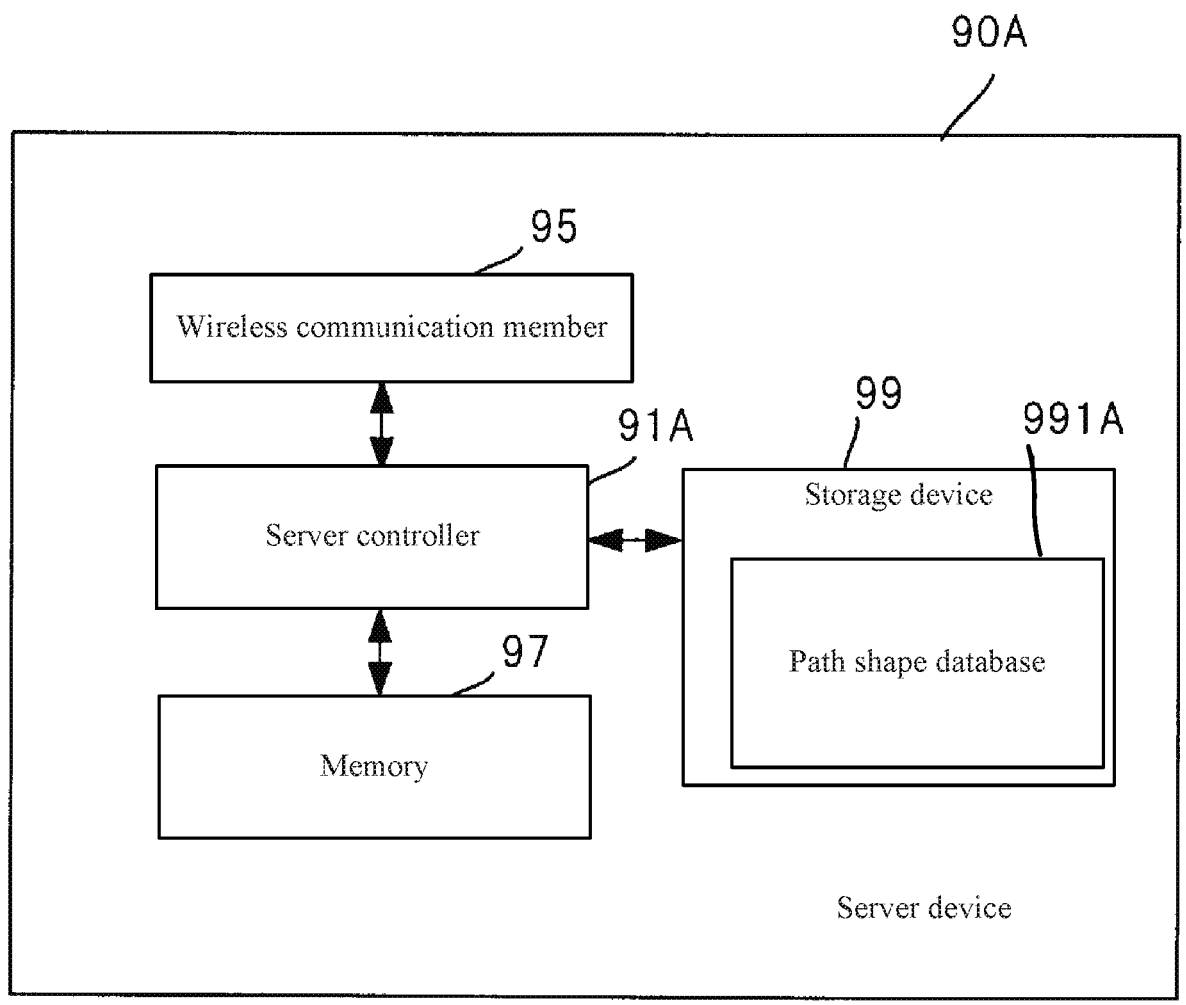
FIG. 20 is a schematic diagram of a hardware configuration of a server device, according to an example embodiment.

FIG. 20 is a schematic diagram of a hardware configuration of the server device 90A. Comparing the server device 90A with the server device 90 of the above embodiment, a server controller 91A replaces the server controller 91, and a path shape database 991A replaces the path shape database 991.

The path shape database 991A may save the path shape sample, information of user review of the path shape sample, and information of selectivity based on the use frequency of the path shape sample, based on each database imaging mode. The information of review of the path shape sample may be based on at least one of information of user review and information of selectivity. In addition, the path shape database 991A may associate the aerial photography images and their appended information obtained through the wireless communication member 95 with the path shape sample that forms the basis of the aerial photography path for the aerial photography images, and may store and save the association relationship. The stored aerial photography images (also referred to as historical aerial photography images) may include aerial photography images captures by and transmitted from one or more UAVs 100A. As described above, the appended information may include information of the flight (i.e., historical flight information) of the UAV 100A when performing aerial photography related to the historical aerial photography images, information related to the imaging device 220, 230 during the aerial photography (i.e., historical imaging information). The historical flight information may include information related to the shape of the imaged object included in the historical aerial photography images (i.e., historical imaged object shape information). The path shape database 991A may transmit at least a portion of the historical aerial photography images and their appended information, along with the path shape samples of the corresponding database imaging mode to the server controller 91A, based on a request from the server controller 91A.

Figure 21:
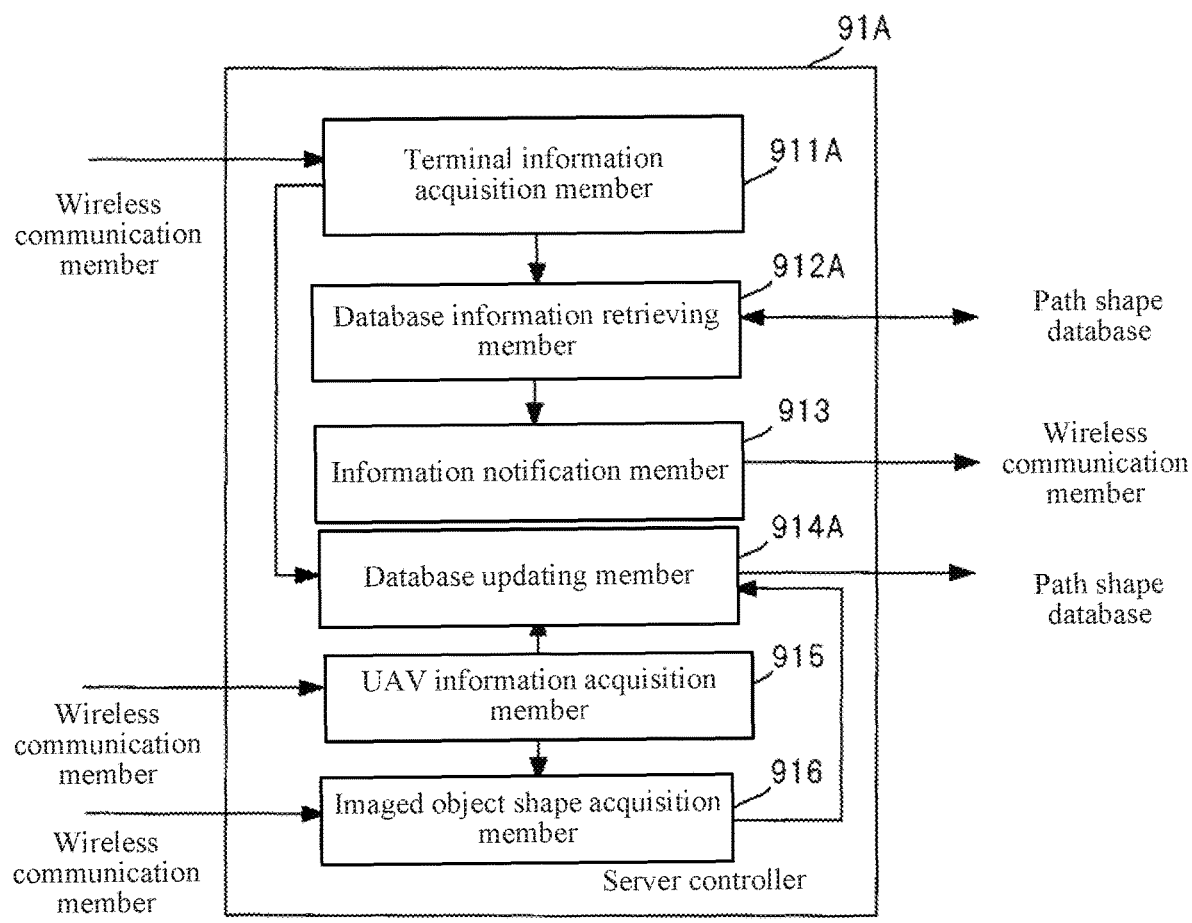
FIG. 21 is a schematic diagram of a functional configuration of a server controller, according to an example embodiment.

FIG. 21 is a schematic diagram of a functional configuration of the server controller 91A. The server controller 91A may include the terminal information acquisition member 911A, the database information retrieving member 912A, the information notification member 813, the database updating member 914A, the UAV information acquisition member 915, and the imaged object shape acquisition member 916. In the server controller 91A shown in FIG. 21, the same configurations as those shown in the server controller 91 of FIG. 6 are assigned with the same labels, the descriptions of which are either omitted or simplified.

The terminal information acquisition member 911A may include functions of the terminal information acquisition member 911. In addition, the terminal information acquisition member 911A may obtain, from the portable terminal 80A through the wireless communication member 95, user review information related to the review of the path shape samples recorded in the path shape database 991A. For example, the user may confirm the aerial photography images captured during the aerial photography along the aerial photography path generated based on the path shape sample, and may determine user review information. In addition, the user review information may be obtained from an information processing device (e.g., a personal computer, a tablet computer terminal) other than the portable terminal 80A.

The database information retrieving member 912A may compare the historical imaged object shape information belonging to the database imaging mode corresponding to a scheduled imaging mode that is recorded in the path shape database 991A with scheduled imaged object shape information obtained through the terminal information acquisition member 911A. That is, the database information retrieving member 912A may compare in order the scheduled imaged object shape information with the historical imaged object shape information belonging to the database imaging mode that is consistent with the scheduled imaging mode, and determine the historical imaged shape information for a shape that is close (or approximate) to the scheduled imaged object shape. That is, the database information retrieving member 912A may determine information of the shape of the imaged object that has been photographed in the past and whose shape is close to a shape of the imaged object scheduled to be aerial photographed, which information is also stored in the path shape database 991A.

Whether the scheduled imaged object shape information and the historical imaged object shape information are similar may be determined based on a consistency level between the two. For example, when the consistency level between the characteristics of the profile of the scheduled imaged object and the characteristics of the profile of the historical images object is relatively high, the historical imaged object shape information may be determined. In addition, in order to make the size of the scheduled imaged object and the size of the historical imaged object to be at the same level and to compare the sizes, the database information retrieving member 912A may normalize the size of the imaged object. In addition, the database information retrieving member 912A may determine historical imaged object shapes which have a consistency level with the scheduled imaged object shape above a predetermined value. The predetermined value may be flexibly changed.

The database information retrieving member 912A may retrieve path shape samples corresponding to the historical imaged object shape information that is similar to the determined scheduled imaged object shape information. The path shape sample corresponding to the historical images shape becomes a basis for the aerial photography path that is used to aerial photograph the aerial photography images of the imaged object having the historical images object shape. The database information retrieving member 912A may determine based on which path shape sample the aerial photography path is generated based on the consistency level of the path shapes. The database information retrieving member 912A may retrieve at least a portion of the appended information of one or more of the aerial photography images.

The database information retrieving member 912A may retrieve one or more path shape samples having relatively high reviews from path shape samples belonging to the database imaging mode corresponding to the scheduled imaging mode. The path shape samples having relatively high reviews may be, for example, path shape samples having user review information above a predetermined benchmark (e.g., value of the review is 3.5 or more, level B or higher in review values A, B, and C), or may be path shape samples having a selectivity above a predetermined value, or samples determined based on other reviews. The database information retrieving member 912 may retrieve, along with the retrieved path shape sample, appended information of aerial photography images captured in aerial photography along an aerial photography path based on the path shape sample.

The UAV information acquisition member 915 may obtain, through the wireless communication member 95, information from the UAV 100A (e.g., aerial photography images and their appended information). The obtained aerial photography images and their appended information may become objects to be registered in the path shape database 991A.

The imaged object shape acquisition member 916 may perform image recognition processing on aerial photography images obtained through the UAV information acquisition member 915, and may retrieve the imaged object included in the aerial photography images. The imaged object shape acquisition member 916 may obtain information relating to the shape (e.g., historical images object shape) of the retrieved imaged object (e.g., mountain). For example, the imaged object shape acquisition member 916 may obtain information of locations where the aerial photography images are obtained based on the aerial photography path used for aerial photographing the aerial photography images. The imaged object shape acquisition member 916 may obtain information of the location of the imaged object based on a location relationship of the imaged object relative to the aerial photography images, the imaging information when capturing the aerial photography images, etc. By obtaining the information of the location of the images object, reference of the map information may be performed. Like the scheduled images object shape, the historical imaged object shape may be planar two-dimensional shape data such as planar map data, or may be three-dimensional shape data. The method for obtaining the two-dimensional shape data and the three-dimensional shape data may be the same as those associated with obtaining the scheduled imaged object shape.

The database updating member 914A may register, in the path shape database 991A, information obtained from the UAV 100A (e.g., aerial photography images and their appended information), and user review information. The database updating member 914A may update the selectivity information based on the number of times the path shape sample is retrieved from the path shape database 991A. In addition, associating the aerial photography images with which of the path shape samples in the path shape database 991A may be determined based on the similarity (consistency level) of the path shape sample with the aerial photography path used in actual aerial photography of the aerial photography images. The determination may be implemented by the database updating member 914A, or may be implemented by other parts.

FIG. 22A and FIG. 22B illustrate information stored in the path shape database 991A in the form of a table. The path shape database 991A may store the aerial photography shape sample, the user review information, and the selectivity information based on each database imaging mode. The path shape database 991A may store aerial photography images captured in aerial photography along an aerial photography path based on the aerial photography shape sample and their appended information based on each database imaging mode. Zero or one or more than one of the aerial photography images and their appended information may be stored based on each aerial photography shape sample. In FIG. 22A and FIG. 22B, the database imaging mode of "mountain" is shown, and other database imaging mode information is omitted.

In FIG. 22A and FIG. 22B, the appended information may include information of the imaged object shape, information of the aerial photography path, information of aerial photography time, information of aerial photography period, information of aerial photography weather, information of aerial photography field of view, information of aerial photography direction, information of aerial photography attitude, information of aerial photography range, and information of distance to the imaged object. For the convenience of illustration, FIG. 22A and FIG. 22B are separated. It is understood that they may be stored in the same table.

The user review information indicates the user review of the aerial photography images registered in the path shape database 991A. For example, the user may operate the portable terminal 80A. The portable terminal 80A may receive, play, and display the aerial photography images registered in the path shape database 991A. The user may confirm the aerial photography images, and may input, through the operation member 83 of the portable terminal 80A, review of the path shape sample that forms the basis of the aerial photography path used for capturing the aerial photography images. The input review information may be transmitted to the server device 90A through the wireless communication member 85 of the portable terminal 80A, and may be registered in the path shape database 991A of the server device 90A. The user review may be implemented through an application on the Web or a social networking service ("SNS").

The input review information may be, for example, a review represented by a score between 0~5. The user review information may be represented by a statistical value of the user review values of various users, such as the average value. The input review information may be information such as good, not good, like, not like, o, x, etc. the user review information may be represented by statistical values of total values of, for example, good, like, o. The input review information may be rating A, rating B, rating C, etc. The user review information may be statistical information such as the average value of the user review of various users. The user review information may be registered by multiple users.

The selectivity information may indicate the number of times a path shape sample registered in the path shape database 991A is retrieved based on one or more requests from the portable terminal 80A. That is, the selectivity information may indicate a degree of being selected of the path shape sample recorded in the path shape database 991A. The selectivity may be the number of times being selected (selection times) of a same path shape sample, or may be a ratio (selection rate) between the selection times of a path shape sample relative to the selection times of all of the path shape samples, or may be information related to the selection of the path shape sample. Whenever a path shape sample is retrieved from the path shape database 991A through the database information retrieving member 912, the selectivity information may be updated through the database information retrieving member 912. That is, when the path shape sample is frequently used, the selectivity may increase.

In addition, the path shape database 991A may record the appended information of the historical aerial photography images, and may omit the records of the historical aerial photography images.

Next, generating the scheduled imaging information will be described.

In the server device 90A, the database information retrieving member 912A may use the database imaging mode corresponding to the scheduled imaging mode as the keyword, and may retrieve a path shape sample corresponding to a historical imaged object shape that is similar to the schedule imaged object shape, where the path shape sample belongs to the database imaging mode. In the path shape sample thus retrieved, there is actual achievement of obtaining aerial photography images of imaged object whose shape is very similar through aerial photography along an aerial photography path based on the path shape sample. Therefore, the reliability is relatively high in the aerial photography of the imaged object scheduled to be aerial photographed. In this situation, along with the path shape sample, the imaging information such as the aerial photography field of view and the aerial photography direction is also suitable for the aerial photography of the imaged object having the historical imaged object shape that is similar to the scheduled imaged object shape. Therefore, the imaging information generating member 817A may generate scheduled imaging information based on historical imaging information corresponding to the path shape sample retrieved from the path shape database 991A.

In the server device 90A, the database imaging mode may be used as a keyword to retrieve a path shape sample having a relatively high review that belongs to the database imaging mode. Because the aerial photography images captured in the aerial photography along the aerial photography path that is based on the path shape sample have relatively high reviews, the path shape sample thus retrieved can be used for attractive aerial photography for other users who have used the path shape sample. In this situation, along with the path shape sample, the imaging information such as the aerial photography field of view and the aerial photography direction may also be suitable for the aerial photography of the imaged object. As such, the imaging information generating member 817A may generate scheduled imaging information based on the historical imaging information corresponding to the path shape sample retrieved from the path shape database 991A.

For example, the imaging information generating member 817A may directly use the historical imaging information obtained through the server information acquisition member 814A as the scheduled imaging information. In addition, the imaging information generating member 187A may generate the scheduled imaging information by processing at least a portion of the historical imaging information obtained through the server information acquisition member 814A. In such situation, the imaging information generating member 817A may generate the processing information by adding a difference value (e.g., a different in the heights of the mountain, the difference in the widths (radii) of the mountain) between the scheduled imaged object shape information and the historical imaged object shape information included in the appended information, and generate the imaging information based on the processing information.

When the UAV 100A only performs aerial photography along the aerial photography path that is based on the path shape, the imaging device of the UAV 100A may not face the imaged object, or is out of an imaging range, or there is no sufficient in the setting of the field of view. Relative to these, the portable terminal 80A may determine a desired imaging method (e.g., imaging information) to be performed by the imaging device 220 or the imaging device 320 of the UAV 100A. Therefore, the imaging information for photographing the imaged object may be configured, i.e., the camera may be configured, thereby further improving the possibility of photographing the imaged object at a high precision. In addition, the portable terminal 80A can generate scheduled imaging information using historical imaging information associated with previous, past aerial photography and stored in the path shape database 991A. Therefore, the camera configuration can be automatically implemented, which does not require the user to manually configure the camera, thereby enhancing the convenience for the user.

Figure 23:
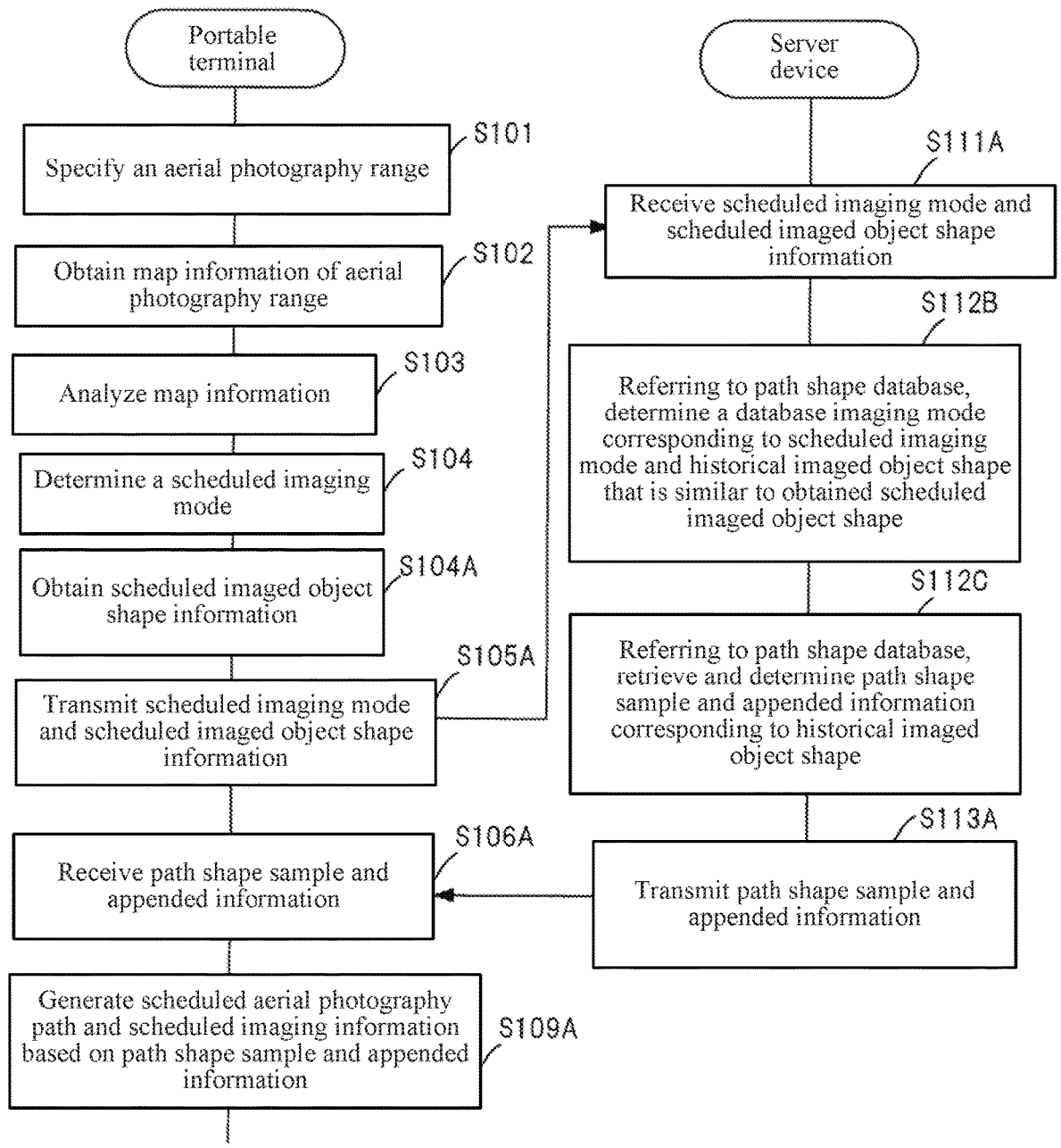
FIG. 23 is a flow chart illustrating first actions for generating a scheduled aerial photography path by an aerial photography path generating system, according to an example embodiment.

FIG. 23 is a flow chart illustrating actions for generating the scheduled aerial photography path performed by the aerial photography path generating system 10A. In addition, in FIG. 23, steps that are the same as those shown in FIG. 12 are assigned with the same step numbers, the descriptions of which are either omitted or simplified.

First, in the portable terminal 80A, the terminal controller 81A may perform the processes of S101~S104. The imaged object shape acquisition member 818 may obtain the scheduled imaged object shape information of the imaged object (e.g., an imaged object in a main area of the scheduled imaging mode) in the aerial photography range (S104A). The wireless communication member 95 may transmit the imaging mode information and the scheduled imaged object shape information to the server device 90A (S105A).

In the server device 90A, the terminal information acquisition member 911A may receive the scheduled imaging mode and the scheduled imaged object shape information (S111A). The database information retrieving member 912A may determine, with reference to the path shape database 991A, a database imaging mode corresponding to the scheduled imaging mode and historical imaged object shape that is similar to the obtained scheduled imaged object shape (S112B). The database information retrieving member 912A may retrieve at least a portion of a path shape sample corresponding to the determined historical imaged object shape and the appended information (S112C). The information notification member 913 may transmit at least a portion of the retrieved path shape sample and the appended information to the portable terminal 80A through the wireless communication member 95 (S113A).

In the portable terminal 80A, the server information acquisition member 814A may obtain at least a portion of the path shape sample and appended information from the server device 90A through the wireless communication member 85 (S106A). The aerial photography path generating member 816A may generate a scheduled aerial photography path based on the path shape sample and the obtained appended information (S109A). For example, the aerial photography path generating member 816A may generate processing information based on a difference (e.g., difference in the heights of the mountains, difference in the widths of the mountains, difference in the radii of the ground cross sectional areas) between scheduled imaged object shape information and historical imaged object shape information included in the appended information, in order to eliminate the difference (such that the scales match), and may generate the scheduled aerial photography path based on the processing information. The imaging information generating member 817 may generate scheduled imaging information based on at least a portion of imaging information included in the appended information (S109A). The generated scheduled aerial photography path and the scheduled imaging information may be transmitted to the UAV 100A, and may be configured as the aerial photography path and the imaging information on the UAV 100A.

In addition, the generation of the scheduled aerial photography path and the scheduled imaging information, similar to the embodiment described above, may also use processing information input through the operation member 83. In addition, when multiple path shape samples are retrieved from the path shape database 991A, similar to the embodiment described above, the portable terminal 80A may select a path shape sample from the multiple path shape samples through the operation member 83.

According to the actions shown in FIG. 23, the portable terminal 80A and the aerial photography path generating system 10A may obtain the path shape sample based on a consistency level between the scheduled imaged object shape and the historical imaged object shape. Therefore, because the aerial photography path generating system 10A may perform computational processing through the server device 90A to determine the path shape sample, when compared with selecting the path shape sample through the operation member, convenience may be improved for the user. In addition, the path shape sample may be determined by referencing to the historical imaged object shape. Therefore, an aerial photography path similar to the historical aerial photography path corresponding to the historical imaged object shape can be generated, thereby improving the trustworthiness of the user. In addition, the portable terminal 80A and the aerial photography path generating system 10A may generate an aerial photography path along a mountain that is similar to a mountain shape aerial photographed in the past, thereby reducing the possibility of colliding with the mountain or crash.

In addition, the portable terminal 80A and the aerial photography generating system 10A may perform fine adjustment to the path shape sample in order to eliminate the difference (e.g., difference between heights of mountains, difference in the widths of the mountains, difference in the radii of ground cross sectional areas) between the scheduled images object shape and the historical imaged object shape. Therefore, under the condition of normalization, adjustment may be made to use the same flight path for imaged objects having similar shapes. As a result, the portable terminal 80A and the aerial photography path generating system 10A may not need the user to user the operation member 83 to input all of the processing information, thereby improving the convenience for the user. In addition, when aerial photographing an imaged object having a shape similar to that of an imaged object that has been aerial photographed in the past, the probability of obtaining the same aerial photography images is increased. The portable terminal 80A and the aerial photography path generating system 10A may provide stable aerial photography.

In addition, when the scheduled imaged object shape and the historical imaged object shape are three-dimensional shapes, the portable terminal 80A and the aerial photography path generating system 10A may add a profile of a mountain in the height direction, besides the shape of the ground cross sectional area of the mountain, to obtain the path shape sample. Therefore, even when a characteristic shape exists at a mountainside, and when an attractive field exists, the portable terminal 80A and the aerial photography path generating system 10A may obtain a path shape sample having added the characteristic shape, and to generate the scheduled aerial photography path.

Figure 24:
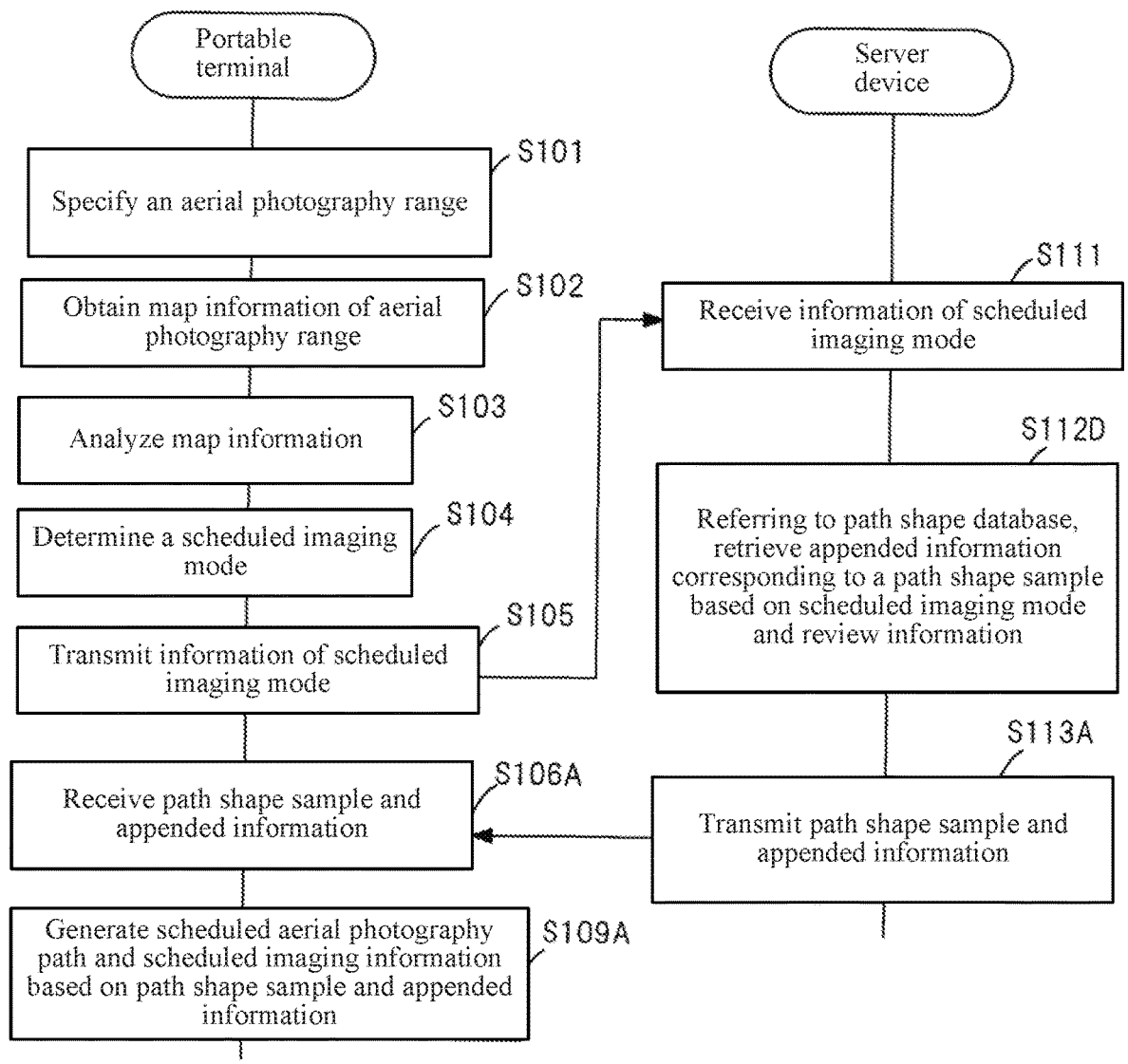
FIG. 24 is a flow chart illustrating second actions for generating a scheduled aerial photography path by the aerial photography path generating system, according to an example embodiment.

FIG. 24 is a flow chart illustrating actions for generating the scheduled aerial photography path performed by the aerial photography path generating system 10. In FIG. 24, the steps that are the same as those shown in FIG. 12 or FIG. 23 are assigned with the same step numbers, and the descriptions of which are either omitted or simplified.

First, the portable terminal 80A may perform processes of S101~S105. The server device 90A may perform the process of S111.

In the server device 90A, the database information retrieving member 912A may refer to the path shape database 991A, and retrieve a path shape sample from the path shape samples belonging to the database imaging mode corresponding to the scheduled imaging mode, which has a relatively high review (e.g., the highest review). In addition, the database information retrieving member 912A may retrieve at least a portion of the appended information corresponding to the path shape sample (S112D).

The server device 90A may perform the process of S113A. The portable terminal 80A may perform the processes of S106A, S109A.

Figure 25:
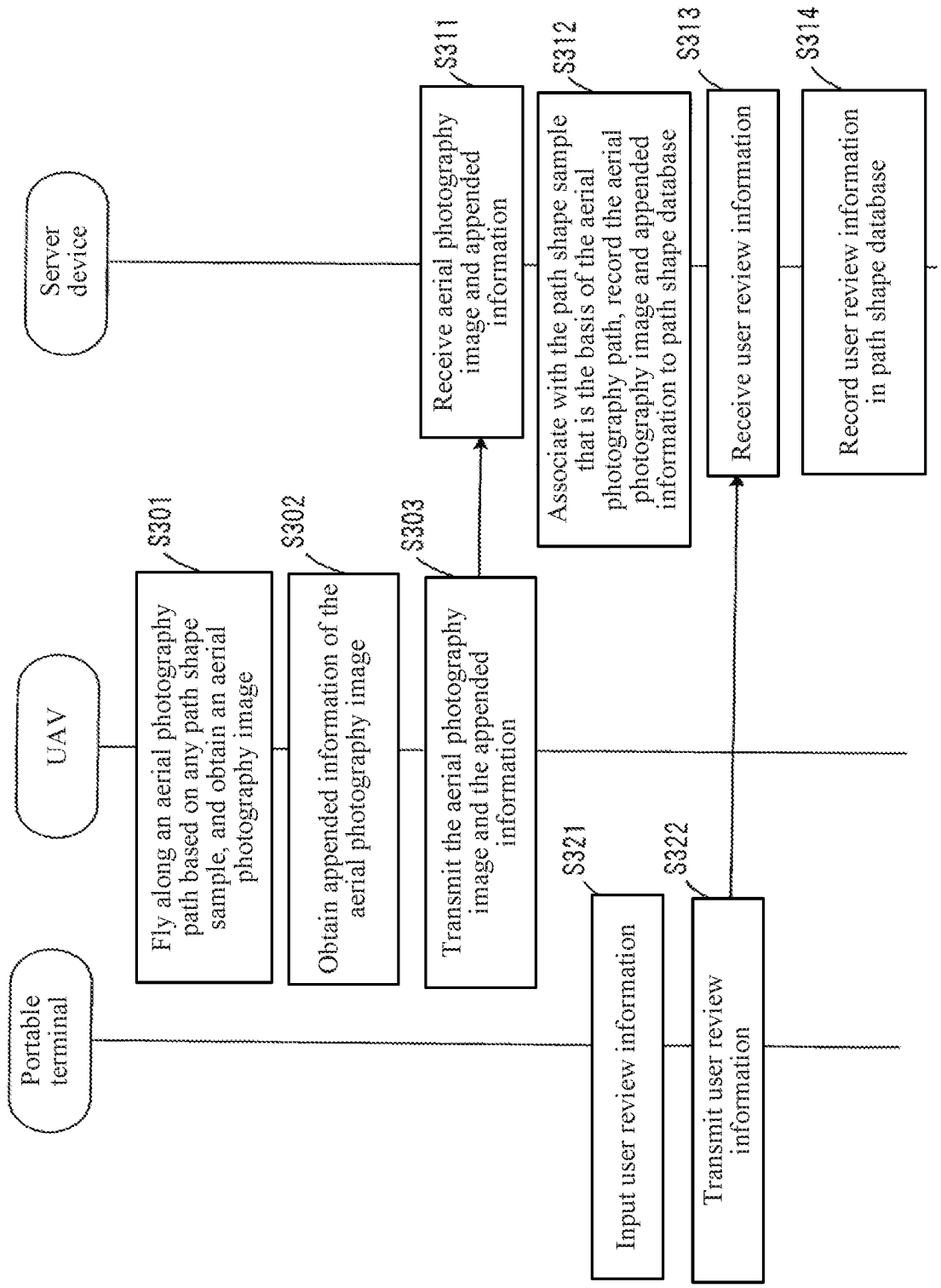
FIG. 25 is a flow chart illustrating actions for registering information of the path shape DB that is related to aerial photography images by the aerial photography path generating system, according to an example embodiment.

FIG. 25 is a flow chart illustrating actions for registering information related to the aerial photography images in the path shape database 991A, as performed by the aerial photography path generating system 10A.

When the UAV 100A flies according to an aerial photography path that is based on any path shape sample, the imaging device 220 or the imaging device 230 may capture images to obtain the aerial photography images (S301). The UAV controller 110A may obtain the appended information (S302). The communication interface 150 may transmit the aerial photography images and the appended information to the server device 90A (S303).

In the server device 90A, the wireless communication member 95 may receive the aerial photography and the appended information from the UAV 100A (S311). The database updating member 914A may register the aerial photography images and their appended information to the path shape database 991A (S312).

In the portable terminal 80A, the wireless communication member 85 may obtain the aerial photography images corresponding to the desired aerial photography path sample from the server device 90A. The user of the portable terminal 80A may confirm, through the display 88, the obtained aerial photography images, and may determine a user review. The user may input the user review information through the operation member 83 of the portable terminal 80A (S321). The wireless communication member 85 may transmit the user review information to the server device 90A (S322).

In the server device 90A, the wireless communication member 95 may receive the user review information from the portable terminal 80A (S313). The database updating member 914A may update the user review information of the corresponding aerial photography path sample recorded in the path shape database 991A based on the received user review information.

According to the actions shown in FIG. 24, 25, the portable terminal 80A and the aerial photography path generating system 10A, before the takeoff of the UAV 100A for aerial photography, the portable terminal 80A and the server device 90A may cooperate with one another, to obtain the path shape sample based on an imaged object existing in the desired aerial photography region (e.g., aerial photography range A1). Therefore, when the UAV 100A flies and aerial photographs along the scheduled aerial photography path based on the path shape sample, the aerial photography images and the appended information may be registered into the path shape database 991A. Therefore, whenever each UAV 100A performs the aerial photography based on the path shape database 991A, the aerial photography images and their appended information may be registered. In addition, the review information of the aerial photography path based on the path shape sample may also be registered in the path shape database 991A. For example, when a path shape sample having a relatively high review is selected, it is a path shape sample with which other users are also satisfied. Therefore, it can be expected tha the satisfaction level of the users who have scheduled the aerial photography will also be relatively high. In addition, for an aerial photography path based on the path shape sample having a relatively high review, it is predicted that the fly frequency will be increased, and the user review will be further improved. Therefore, the server device 90A may provide information of a recommended path shape sample that is recorded in the path shape database 991A through a machine learning method.

In addition, information processing devise other than the portable terminal 80A (e.g., the transmitter 50, the UAV 100A, a personal computer, other information processing device) may also include the aerial photography assistance functions (e.g., aerial photography path generating function, imaging information generating function) of the portable terminal 80A.

In some embodiments, the server device 90A may register new imaging mode and new path shape sample that have not been registered in the path shape database 991A. For example, the database updating member 914A may average the multiple aerial photography paths used for aerial photographing the same imaged object (e.g., mountain) to obtain multiple aerial photography images based on aerial photography paths that are not based on the path shape samples. That is, in the imaging modes used for imaging the same imaged object, the database updating member 914A may establish a model using the average aerial photography path as a shape of a typical aerial photography path, and generate a path shape sample.

As such, the server device 90A may generate a path shape sample that is similar to the shape of an aerial photography path that is frequently used for aerial photographing the imaged object, and register the path shape sample in the path shape database 991A. In addition, the server device 90A need not register the new imaging mode and the new path shape sample through the operation member 83, thereby improving the convenience for the user.

In the above embodiments, a portion of the processes executed by the portable terminals 80, 80A may be executed by the server devices 90, 90A. Likewise, a portion of the processes executed by the server devices 90, 90A may be executed by the portable terminals 80, 80A.

As such, the server devices 90, 90A and the aerial photography path generating system 10, 10A may use the resources of the server device 90 to reduce the processing load of the portable terminal 80, 80A, and to generate the scheduled aerial photography path and the scheduled imaging information. In the meantime, the convenience for the user in aerial photography assistance may be improved, and the safety of the UAVs 100, 100A may be improved.

In the above embodiments, the path shape database 991, 991A may be disposed in any information processing device, such as the portable terminal 80, 80A.

In addition, various embodiments may be combined.

The present disclosure has been described above using various embodiments. The technical range of the present disclosure is not limited to the range described in the above embodiments. For a person having ordinary skills in the art, the various embodiments may be modified or improved. From the descriptions of the claims, it is understood that such modifications or improvements can fall in the technical range of the present disclosure.

The execution order of various processes, such as the actions, procedures, steps, and stages of the device, system, program, and method as described in the claims, specification, and the drawings accompanying the specification, as long as there is no express description of "before" or "a priori," etc., and as long as the output of a preceding process is not used in the subsequent process, any execution order may be implemented. Regarding the operation flows described in the claims, specification, and accompanying drawings of the specification, for the convenience, terms "first," and "next" may have been used for descriptions purposes. Such terms do not indicate that the execution order must follow the described order.

DESCRIPTIONS OF LABELS 10, 10A—aerial photography path generating system
50—transmitter
80, 80A—portable terminal
81, 81A—terminal controller
82—interface
83—operation member
85—wireless communication member
87—memory
88—display
90, 90A—server device
91, 91A—server controller
95—wireless communication member
97—memory
99—storage device
100, 100A—UAV
110, 110A—UAV controller
150—communication interface
160—memory
200—universal support
210—rotor mechanism
220, 230—imaging device
240—GPS receiver
250—inertial measurement unit
260—magnetic compass
270—barometric altimeter
280—ultrasonic sensor
290—laser measurement device
811—aerial photography range acquisition member
812—area segmenting member
813—imaging mode determination member
814, 814A—server information acquisition member
815—information processing member
816, 816A—aerial photography path generating member
817, 817A—imaging information generating member
818—imaged object shape acquisition member
911, 911A—terminal information acquisition member
912, 912A—database information retrieving member
913—information notification member
914, 914A—database updating member
915—UAV information acquisition member
916—imaged object shape acquisition member
991, 991A—path shape database
A1—aerial photography range
MA1—map information

What is claimed is:

1. An aerial photography path generating method, comprising:
  obtaining information relating to an aerial photography range for aerial photographing the first aerial photography image;
  segmenting the aerial photography range into multiple areas based on a feature of each imaged object existing in the aerial photography range;
  determining multiple first imaging modes for aerial photographing the first aerial photography image based on each of the segmented multiple areas;
  obtaining information of each of multiple path shapes based on:
    information of a plurality of imaging modes;
    information of a plurality of path shapes representing shapes of a plurality of aerial photography paths;
    correspondence relationships between the plurality of imaging modes and the plurality of path shapes; and
    each of the multiple first imaging modes; and
  generating a first aerial photography path based on the multiple path shapes.

2. The aerial photography path generating method of claim 1, further comprising:
  receiving a first operation for selecting a path shape from one of the multiple path shapes;
  wherein generating the first aerial photography path comprises generating the first aerial photography path based on the selected path shape.

3. The aerial photography path generating method of claim 2, further comprising:
  receiving a second operation for processing the selected path shape,
  wherein generating the first aerial photography path comprises generating the first aerial photography path based on the selected path shape and the second operation.

4. The aerial photography path generating method of claim 1, wherein obtaining the information of the at least one each of the multiple path shapes comprises:
obtaining at least one information from a recording device that records an imaging mode, information of a path shape, information of a shape of an imaged object included in a second aerial photography image that is aerial photographed along an aerial photography path that is based on the path shape.

5. The aerial photography path generating method of claim 4, further comprising:
obtaining information indicating a shape of an imaged object existing in the aerial photography range, which includes:
based on the one of the multiple first imaging modes, obtaining information of a path shape corresponding to the information of the shape of the imaged object recorded in the recording device and similar to the shape of the imaged object obtained from the step of obtaining the information indicating the shape of the imaged object.

6. The aerial photography path generating method of claim 5, wherein the information of the shape of the imaged object obtained in the step of obtaining the information indicating the shape of the imaged object and the information of the shape of the imaged object recorded in the recording device are represented using three-dimensional data.

7. The aerial photography path generating method of claim 5, wherein generating the first aerial photography path comprises:
processing the one of the multiple path shapes based on the information of the shape of the imaged object obtained in the step of obtaining the information indicating the shape of the imaged object and the information of the shape of the imaged object recorded in the recording device, to generate at least a portion of the first aerial photography path.

8. The aerial photography path generating method of claim 1, wherein obtaining the information of each of the multiple path shapes comprises:
obtaining, from a recording device, at least one of information of an imaging mode, information of a path shape, and review information relating to the path shape.

9. The aerial photography path generating method of claim 8, wherein obtaining the information of each of the multiple path shapes comprises:
obtaining the information of one of the multiple path shapes based on a corresponding one of the multiple first imaging modes and the review information.

10. The aerial photography path generating method of claim 1, wherein obtaining the information of each of the multiple path shapes comprises:
obtaining at least one information from a recording device that records information of an imaging mode, information of a path shape, and second imaging information when a second aerial photography image is aerial photographed along an aerial photography path that is based on the path shape.

11. The aerial photography path generating method of claim 10, further comprising:
obtaining the second imaging information corresponding to the path shape; and
generating first imaging information for aerial photographing the first aerial photography image based on the obtained second imaging information.

12. The aerial photography path generating method of claim 1, wherein
determining the multiple first imaging modes comprises:
determining the multiple first imaging modes based on sizes of the multiple areas.

13. The aerial photography path generating method of claim 1,
wherein generating the first aerial photography path comprises: generating a portion of the first aerial photography path based on each of the multiple path shapes, and connecting portions of the first aerial photography path to generate the first aerial photography path.

14. The aerial photography path generating method of claim 1, further comprising:
when one of the multiple first imaging modes is not recorded as an imaging mode in a recording device that records the information of the plurality of imaging modes and the information of the plurality of path shapes, providing a prompt indicating that the information of the one of the multiple first imaging modes is not recorded in the recording device.

15. The aerial photography path generating method of claim 14, further comprising:
generating information of a path shape used in aerial photography under the one of the multiple first imaging modes; and
performing a control to associate and record information of the one of the multiple first imaging modes and the information of the path shape in the recording device.

16. The aerial photography path generating method of claim 15, further comprising:
receiving a third operation for inputting the information of the path shape,
wherein generating the information of the path shape comprises:
generating the information of the path shape based on the third operation.

17. A non-transitory computer-readable storage medium encoded with computer-readable instructions, which when executed by a processor, cause the processor to perform a method comprising:
obtaining information relating to an aerial photography range for aerial photographing the first aerial photography image;
segmenting the aerial photography range into multiple areas based on a feature of each imaged object existing in the aerial photography range;
determining multiple first imaging modes for aerial photographing the first aerial photography image based on each of the segmented multiple areas;
obtaining information of each of multiple path shapes based on:
information of a plurality of imaging modes;
information of path shapes representing a plurality of shapes of a plurality of aerial photography path;
correspondence relationships between the plurality of imaging modes and the plurality of path shapes; and
each of the multiple first imaging modes; and
generating the first aerial photography path based on the at least one path shape.

18. An information processing device, comprising:
a memory storing computer-readable instructions; and
a processor configured to execute the computer-readable instructions to:
obtain information relating to an aerial photography range for aerial photographing a first aerial photography image;

segment the aerial photography range into multiple areas based on a feature of each imaged object existing in the aerial photography range;
determine multiple first imaging modes for aerial photographing the first aerial photography image based on each of the segmented multiple areas;
obtain information of each of multiple path shapes based on:
  information of a plurality of imaging modes;
  information of a plurality of path shapes representing shapes of a plurality of aerial photography paths;
  correspondence relationships between the plurality of imaging modes and the plurality of path shapes; and
  each of the multiple first imaging modes; and
generate a first aerial photography path based on the multiple path shapes.

* * * * *